US007277621B2

(12) United States Patent
Kunieda et al.

(10) Patent No.: US 7,277,621 B2
(45) Date of Patent: Oct. 2, 2007

(54) RECORDING MEDIUM WITH VIDEO INDEX INFORMATION RECORDED THEREIN VIDEO INFORMATION MANAGEMENT METHOD WHICH USES THE VIDEO INDEX INFORMATION, RECORDING MEDIUM WITH AUDIO INDEX INFORMATION RECORDED THEREIN, AUDIO INFORMATION MANAGEMENT METHOD WHICH USES THE AUDIO INDEX INFORMATION, VIDEO RETRIEVAL METHOD WHICH USES VIDEO INDEX INFORMATION, AUDIO RETRIEVAL METHOD WHICH USES THE AUDIO INDEX INFORMATION AND A VIDEO RETRIEVAL SYSTEM

(75) Inventors: Takayuki Kunieda, Tokyo (JP); Yuki Wakita, Tokyo (JP); Masajiro Iwasaki, Kanagawa (JP)

(73) Assignees: Information Broadcasting Laboratories, Inc., Tokyo (JP); Ricoh Company, Ltd., Tokyo (JP)

( * ) Notice: Subject to any disclaimer, the term of this patent is extended or adjusted under 35 U.S.C. 154(b) by 663 days.

(21) Appl. No.: 10/766,891

(22) Filed: Jan. 30, 2004

(65) Prior Publication Data

US 2004/0184774 A1 Sep. 23, 2004

Related U.S. Application Data

(63) Continuation of application No. 09/389,326, filed on Sep. 3, 1999, now Pat. No. 6,771,875.

(30) Foreign Application Priority Data

Sep. 3, 1998 (JP) .............................. 10-249526
Sep. 3, 1998 (JP) .............................. 10-249527
Aug. 12, 1999 (JP) .............................. 11-228531

(51) Int. Cl.
H04N 7/00 (2006.01)
H04N 5/00 (2006.01)
(52) U.S. Cl. ..................... 386/46; 386/125; 386/105
(58) Field of Classification Search ................ 386/46, 386/52, 55, 1, 4, 68, 69, 75, 96, 104, 39
See application file for complete search history.

(56) References Cited

U.S. PATENT DOCUMENTS 5,122,886 A * 6/1992 Tanaka .................... 386/104

(Continued)

FOREIGN PATENT DOCUMENTS

JP 4-239379 A 8/1992

(Continued)

OTHER PUBLICATIONS

Opposition Brief, Nov. 15, 2002; pp. 7-11.

(Continued)

Primary Examiner—Robert Chevalier
(74) Attorney, Agent, or Firm—Oblon, Spivak, McClelland, Maier & Neustadt, P.C.

(57) ABSTRACT

The video index information has a tree structure comprising frame information, sound information, segment information, and package information each as a structure element object. The segment information manages package information for managing a plurality of other segment information as a group, and in the tree structure, the package information is allocated in addition to the frame information and sound information under one segment information, and the video information is managed by using the tree structure of the video index information and structure element objects therein.

37 Claims, 25 Drawing Sheets

U.S. PATENT DOCUMENTS

| | | | |
|---|---|---|---|
| 5,537,528 A | 7/1996 | Takahashi et al. |
| 5,963,203 A | 10/1999 | Goldberg et al. |
| 6,278,446 B1 | 8/2001 | Liou et al. |

FOREIGN PATENT DOCUMENTS

| | | | |
|---|---|---|---|
| JP | 5-265841 A | 10/1993 |
| JP | 5-282379 A | 10/1993 |
| JP | 6-83877 A | 3/1994 |
| JP | 7-225770 A | 8/1995 |
| JP | 7-272445 A | 10/1995 |
| JP | 7-296003 A | 11/1995 |
| JP | 7-306866 A | 11/1995 |
| JP | 7-312749 A | 11/1995 |
| JP | 8-110912 A | 4/1996 |
| JP | 8-163479 A | 6/1996 |
| JP | 8-221432 A | 8/1996 |
| JP | 9-18432 A | 1/1997 |
| JP | 9-50436 A | 2/1997 |
| JP | 9-116846 A | 5/1997 |
| JP | 9-238298 A | 9/1997 |
| JP | 10-40260 A | 2/1998 |
| WO | WO96/17313 | 6/1996 |

OTHER PUBLICATIONS

Decision to Opposition, Apr. 24, 2003; pp. 8-10.

Takayuki Kunieda, et al.; The Package-Segment Model for Movie Retrieval System and Adaptable Application; Jun. 10, 1999.

T.D.C. Little, et al., Multimedia Tools and Applications, vol. 1, pp. 149-172, "Selection and Dissemination of Digital Video Via the Virtual Video Browser", 1995.

B. Simonnot, Proceedings of the SPIE, vol. 2420, pp. 307-317, "A Cooperation Model for Video Document Retrieval", Jan. 1, 1995.

T. Kunieda, et al., Proceedings of the IEEE International Conference on Multimedia Computing and Systems, vol. 2, pp. 944-948, "Package-Segment Model for Movie Retrieval System and Adaptable Application", Jun. 7-11, 1999.

* cited by examiner

FIG.9
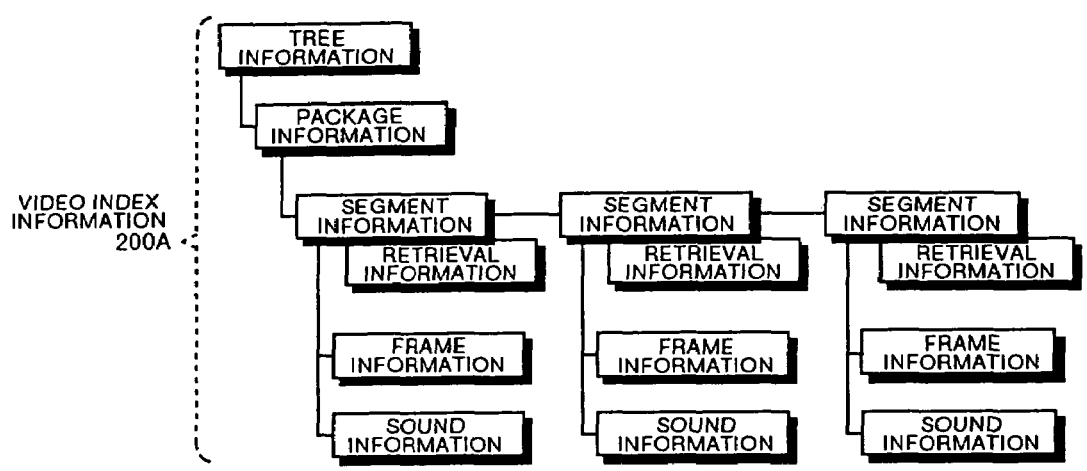
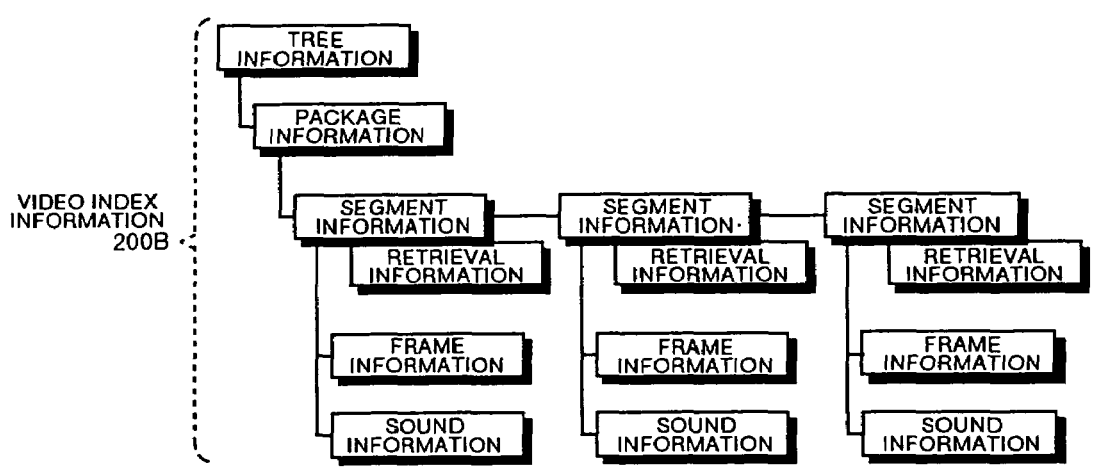

FIG.10

CONDITION 1 ----------------------------------------------------
- REPLAY TIME : Any (NO RESTRICTION)
- FORMAT : Any (NO RESTRICTION)
- PERSON APPEARING : D

CONDITION 2 ----------------------------------------------------
- REPLAY TIME : Any (NO RESTRICTION)
- FORMAT : Any (NO RESTRICTION)
- PERSON APPEARING : A

CONDITION 3 ----------------------------------------------------
- REPLAY TIME : FROM 00:15:00
- FORMAT : Any (NO RESTRICTION)
- PERSON APPEARING : A

CONDITION 4 ----------------------------------------------------
- REPLAY TIME : Any (NO RESTRICTION)
- FORMAT : Any (NO RESTRICTION)
- PERSON APPEARING : E

CONDITION 5 ----------------------------------------------------
- REPLAY TIME : TO 00:15:00
- FORMAT : MPEG2
- PERSON APPEARING : A

FIG.11

| CONDITION | RESULT | SCORE | COINCIDENT CONTENTS |
|---|---|---|---|
| CONDITION1: | Movie 2 | 1 | (PERSON APPEARING:1) |
| CONDITION2: | Movie 1 | 2 | (PERSON APPEARING:2) |
|  | Movie 2 | 1 | (PERSON APPEARING:1) |
| CONDITION3: | Movie 2 | 2 | (REPLAY TIME:1, PERSON APPEARING:1) |
| CONDITION4: | Movie 2 | 3 | (PERSON APPEARING:3) |
| CONDITION5: | Movie 1 | 2 | (PERSON APPEARING:2) |

FIG.12

| CONDITION | RESULT | SCORE | COINCIDENT CONTENTS |
|---|---|---|---|
| CONDITION1: | Movie 2 | 1 | (PERSON APPEARING:1) |
| CONDITION2: | Movie 1 | 2 | (PERSON APPEARING:2) |
|  | Movie 2 | 1 | (PERSON APPEARING:1) |
| CONDITION3: | Movie 1 | 2 | (PERSON APPEARING:2) |
|  | Movie 2 | 2 | (REPLAY TIME:1, PERSON APPEARING:1) |
| CONDITION4: | Movie 2 | 3 | (PERSON APPEARING:3) |
| CONDITION5: | Movie 2 | 3 | (REPLAY TIME:1, FORMAT:1, PERSON APPEARING:1) |
|  | Movie 1 | 2 | (PERSON APPEARING:2) |

FIG.13

| CONDITION | RESULT | SCORE | COINCIDENT CONTENTS |
|---|---|---|---|
| CONDITION1: | Movie 2 | 2 | (PERSON APPEARING:1) |
| CONDITION2: | Movie 1 | 4 | (PERSON APPEARING:2) |
|  | Movie 2 | 2 | (PERSON APPEARING:1) |
| CONDITION3: | Movie 2 | 3 | (REPLAY TIME:1、PERSON APPEARING:1) |
| CONDITION4: | Movie 2 | 6 | (PERSON APPEARING:3) |
| CONDITION5: | Movie 1 | 4 | (PERSON APPEARING:2) |

FIG.14

| CONDITION | RESULT | SCORE | COINCIDENT CONTENTS |
|---|---|---|---|
| CONDITION1: | Movie 2 | 2 | (PERSON APPEARING:1) |
| CONDITION2: | Movie 1 | 4 | (PERSON APPEARING:2) |
|  | Movie 2 | 2 | (PERSON APPEARING:1) |
| CONDITION3: | Movie 1 | 4 | (PERSON APPEARING:2) |
|  | Movie 2 | 3 | (REPLAY TIME:1、PERSON APPEARING:1) |
| CONDITION4: | Movie 2 | 6 | (PERSON APPEARING:3) |
| CONDITION5: | Movie 1 | 4 | (PERSON APPEARING:2) |
|  | Movie 2 | 4 | (REPLAY TIME:1、FORMAT:1、PERSON APPEARING:1) |

FIG.15

| CONDITION | RESULT | SCORE | COINCIDENT CONTENTS |
|---|---|---|---|
| CONDITION1: | Movie 2 | 3 | (PERSON APPEARING:1) |
| CONDITION2: | Movie 1 | 6 | (PERSON APPEARING:2) |
|  | Movie 2 | 3 | (PERSON APPEARING:1) |
| CONDITION3: | Movie 1 | 6 | (PERSON APPEARING:2) |
|  | Movie 2 | 4 | (REPLAY TIME:1, PERSON APPEARING:1) |
| CONDITION4: | Movie 2 | 9 | (PERSON APPEARING:3) |
| CONDITION5: | Movie 1 | 6 | (PERSON APPEARING:2) |
|  | Movie 2 | 5 | (REPLAY TIME:1, FORMAT:1, PERSON APPEARING:1) |

FIG.16

| CONDITION | RESULT | SCORE | POSITIONAL INFORMATION | SEGMENT INFORMATION | COINCIDENT CONTENTS |
|---|---|---|---|---|---|
| PERSON APPEARING A, E | Movie 2 | 2 | Segment#2 | 2 | (PERSON APPEARING:2) |
|  |  |  | Segment#1 | 1 |  |
|  |  |  | Segment#3 | 1 |  |
|  | Movie 1 | 1 | Segment#1 | 1 | (PERSON APPEARING:1) |
|  |  |  | Segment#2 | 1 |  |

FIG.18

| HIERARCHY LEVEL | HIERARCHY LEVEL BASED ON PACKAGE INFORMATION AS A REFERENCE |
|---|---|
| 0 | TREE INFORMATION 101 |
| 1 | PACKAGE INFORMATION 105A<br>SEGMENT INFORMATION 104A<br>FRAME INFORMATION 102A<br>SOUND INFORMATION 103A |
| 2 | PACKAGE INFORMATION 105B<br>SEGMENT INFORMATION 104B, 104C, 104D<br>FRAME INFORMATION 102B, 102C, 102D<br>SOUND INFORMATION 103B, 103C, 103D |
| 3 | PACKAGE INFORMATION 105C<br>SEGMENT INFORMATION 104E, 104F<br>FRAME INFORMATION 102E, 102F<br>SOUND INFORMATION 103E, 103F |

FIG.19

| HIERARCHY LEVEL | HIERARCHY LEVEL BASED ON STRUCTURE ELEMENT OBJECT AS A REFERENCE |
|---|---|
| 0 | TREE INFORMATION 101 |
| 1 | ALL PACKAGE INFORMATION 105 |
| 2 | ALL SEGMENT INFORMATION 104 |
| 3 | ALL PACKAGE INFORMATION 102 AND SOUND INFORMATION 103 |

FIG.21

| STRUCTURE ELEMENT OBJECT NO. | HIERARCHY LEVEL | SCORE | COINCIDENT CONTENTS |
|---|---|---|---|
| Segment #0101 | 3 | 3 | CARS/STRONG YEN |
| Segment #1403 | 3 | 2 | STRONG YEN/ PRESIDENT CLINTON |
| Segment #0051 | 2 | 1 | STRONG YEN |
| Segment #0010 | 1 | 1 | PRESIDENT CLINTON |

FIG.24
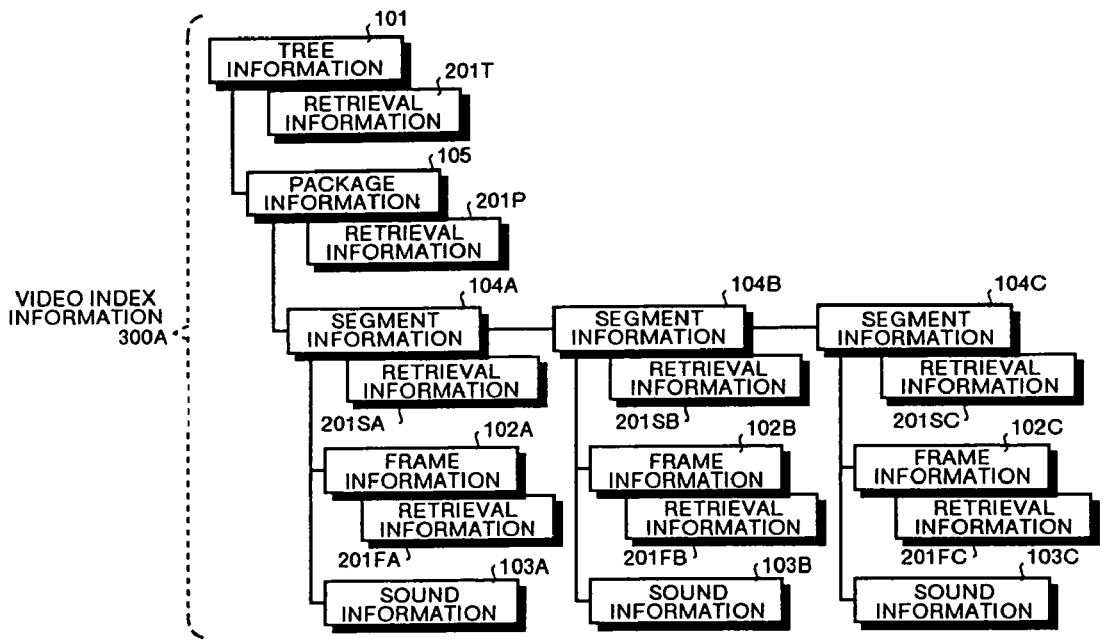
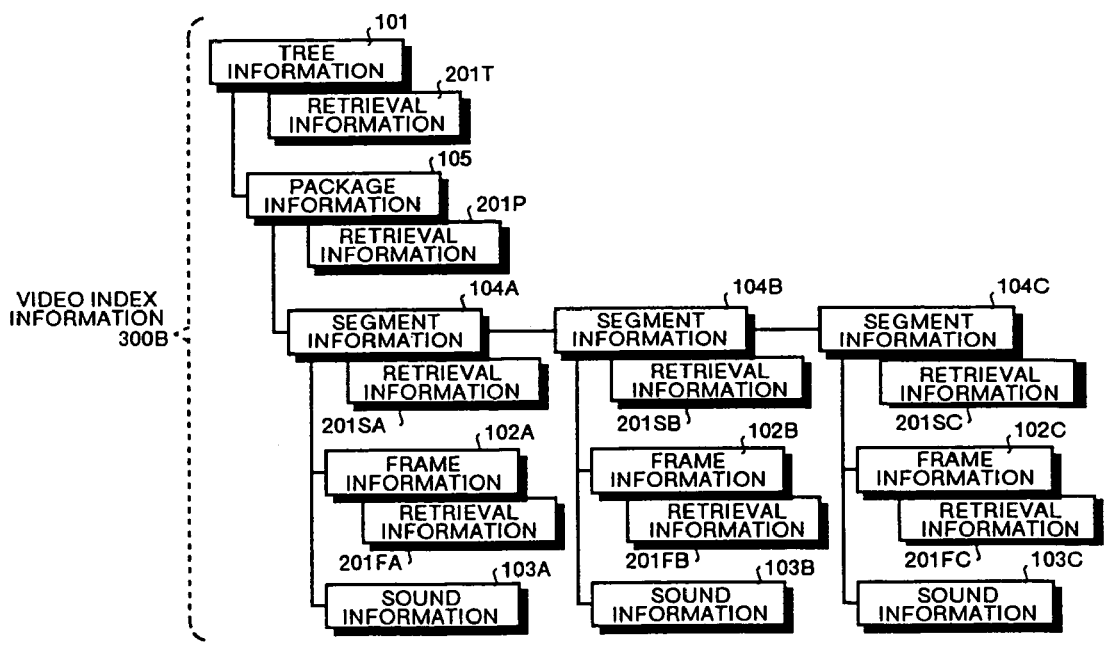

FIG.25

CONDITION --------------------------------------------------
    TITLE : NEWS
    REPLAY TIME : FROM00:05:00 TO 00:30:00
    SCENE : US POLICY TOWARD JAPAN
    KEY FRAME : IMAGE OF PRIME MINISTER
----------------------------------------------------------------

FIG.26

| RESULT | SCORE | COINCIDENT CONTENTS |
|---|---|---|
| Movie A | 7 | TREE INFORMATION 101<br>PACKAGE INFORMATION 105<br>SEGMENT INFORMATION 104C<br>FRAME INFORMATION 102A<br>FRAME INFORMATION 102B |
| Movie B | 5 | TREE INFORMATION 101<br>PACKAGE INFORMATION 105<br>SEGMENT INFORMATION 104C<br>FRAME INFORMATION 102C |

FIG.28

| RESULT | SCORE | COINCIDENT CONTENTS |
|---|---|---|
| Movie B | 8 | TREE INFORMATION 101<br>PACKAGE INFORMATION 105<br>SEGMENT INFORMATION 104C<br>FRAME INFORMATION 102C |

RECORDING MEDIUM WITH VIDEO INDEX INFORMATION RECORDED THEREIN VIDEO INFORMATION MANAGEMENT METHOD WHICH USES THE VIDEO INDEX INFORMATION, RECORDING MEDIUM WITH AUDIO INDEX INFORMATION RECORDED THEREIN, AUDIO INFORMATION MANAGEMENT METHOD WHICH USES THE AUDIO INDEX INFORMATION, VIDEO RETRIEVAL METHOD WHICH USES VIDEO INDEX INFORMATION, AUDIO RETRIEVAL METHOD WHICH USES THE AUDIO INDEX INFORMATION AND A VIDEO RETRIEVAL SYSTEM

CROSS REFERENCE TO RELATED APPLICATIONS

This application is a continuation of and claims the benefit of the earlier filing date of U.S. patent application Ser. No. 09/389,326, filed on Sep. 3, 1999, now U.S. Pat. No. 6,771,875, the entire contents of which being incorporated herein by reference.

FIELD OF THE INVENTION

The present invention relates to a recording medium with video index information recorded therein, a video information management system which uses the video index information, a recording medium with audio index information recorded therein, an audio information managing method which uses the audio index information, a video retrieval method which uses the video index information, an audio retrieval method which uses the audio index information, and a video retrieval system. More specifically this invention relates to a recording medium with video index information available for retrieval of a movie and/or sounds, indexing of broadcast information, editing and preparation of a video program, provision of new information services to video information or for other purposes, a video information management method which uses video index information, an audio information management method which uses a recording medium with audio index information recorded therein and an audio information, a video retrieval method which uses the video index information with convenience in video retrieval further improved by video index information having a data structure with a logic structure of video information or audio information expressible therein, an audio retrieval method which uses audio index information, and a video retrieval system.

BACKGROUND OF THE INVENTION

In recent years, in association with progress in the fields of computer-related technology or popularization of electronic networks such as the Internet, Intranet, Extranet or the like, all types of information used in daily life, business, and services are converted to electronic information. This information is then delivered to end users or accumulated in a computer-based database.

As described above, electronic information is used in various forms (including processing, retrieval, and delivery of information) irrespective of whether the information is digital one or analog one, and there have been proposed or actually put into use various types of technology for treating the electronic information itself with a format or a data structure enabling treatment thereof in an easier way.

For instance, text information, which is one type of electronic information, has a structure tag expressing a logic structure such as SGML, HTML, and XML to express the logic structure defined therein, and contents of information and a logic structure thereof can be expressed when the information is delivered. Therefore, when text information is to be used, processing for preparing and processing a summary enabling efficient retrieval of the text information can be executed at a higher speed.

In case of video information, which is another type of electronic information, there has been provided the video filing technology enabling efficient accumulation or retrieval of static images or movies.

Further as a conventional type of technology for retrieval of video-images, there have been disclosed the "Medium For Retrieving Animation Image Information And Device Therefor" in Japanese Patent Laid-Open Publication No. HEI 6-83877, "Method And Device For Video Image Retrieval" in Japanese Patent Laid-Open Publication No. HEI 8-163479, "Animation Retrieving System" in Japanese Patent Laid-Open Publication No. HEI 8-221432, "Video/Audio Raw Material Managing/Retrieval System" in Japanese Patent Laid-Open Publication No. HEI 9-18432, "Method And Device For Retrieving Video Image" in Japanese Patent Laid-Open Publication No. HEI 9-50436, and "Video Retrieval Method" in Japanese Patent Laid-Open Publication No. HEI 10-40260.

However, method of expressing a logic structure inside the video information for video information including sounds and animation is unknown. Therefore, there are problems such that the use of video information is not easy as compared to other types of information, or that there are several restrictions in reproducing the video information. In other words, there is the problem that there has not been provided the user interface technique enabling improvement in adaptability of video information to operation, application, and treatment.

More specifically, there have been such defects in the conventional technology as (1) retrieval can not be made with respect to the internal information in the video information, (2) jumping to a required section in order to identify a required scene can not be executed unless the entire video information is checked once and marks are put at required sections, and (3) a dedicated device or technology is required for preparing a digest of video information.

With the conventional technology for retrieving video-images as described above it is possible to retrieve video information including a desired scene from a plurality of video information (such as, for instance, a plurality of movie contents) or to identify a position at which a desired scene is included in one video information. However, the techniques can not always be applied to all types of video information because of the defects as described below.

With the "Medium For Retrieving Animation Image Information And Device Therefor" in Japanese Patent Laid-Open Publication No. HEI 6-83877, the operator is required to find out a desired scene, by looking at a movie index previously prepared by copying a sequence of moving pictures. In this case, there is the problem that a video-image obtained as a result of retrieval depends on subjectivity of the operator who searches visually by checking the moving picture index, and also that a large volume of moving pictures can not be treated.

With the "Method And Device For Video Image Retrieval" disclosed in Japanese Patent Laid-Open Publication No. HEI 8-163479, it is required to successively display a series of images each showing a scene in video-information so that an operator can find out a desired scene from the displayed images. In this case, there is the problem that a video-image obtained as a result of retrieval depends on subjectivity of an operator searches visually by checking the moving picture index, and also that a large volume of moving pictures can not be treated.

With the "Animation Retrieving System" disclosed in Japanese Patent Laid-Open Publication No. HEI 8-221432, a desired video is retrieved by using a menu in which videos as objects for retrieval are classified, so that a work for classifying the videos as objects for retrieval is required. Therefore, there is a problem that the precision in retrieval varies depending on how the videos are classified for preparing a menu.

The "Video/Audio Raw Material Managing/Retrieval System" according to Japanese Patent Laid-Open Publication No. HEI 9-18432 is for a system used in a business organization or a public facility treating a large volume of video information such as a broadcasting station. Therefore, there is the problem that the information which can be treated with this system is limited to video information such as that for a news program for which a text expressing the content switch characters exists.

With the "Method And Device For Retrieving Video Image" disclosed in Japanese Patent Laid-Open Publication No. HEI 9-50436, a keyword for retrieval is assigned to each video information, so that by inputting a retrieval keyword indicating desired audio information, to retrieve video information with a keyword for retrieval identical to the retrieval keyword can be retrieved. However, it is necessary to assign a keyword for retrieval taking into considerations contents of the entire video information as an object for retrieval when assigning a keyword for retrieval to the video information, so that it is disadvantageously troublesome to select and assign a keyword for retrieval when there are may topics in one video information, or when a time of one video information is long.

The "Video Retrieval Method" disclosed in Japanese Patent Laid-Open Publication No. HEI 10-40260 requires that character information such as superimposition is included in the video information as an object for retrieval, and can not be applied to video information not including character information.

Similarly, with the conventional technology as described above, there has not been provided a method for expressing a logic structure inside an audio information. Therefore, there are the problems that it is not easy to use audio information as compared to other types of information, or that there are some restrictions in reproducing audio information. In other words, a user interface enabling sufficient improvement in operating, processing, and treating audio information is not known.

Further a video retrieval system making it possible to easily retrieve internal information inside video information has not been provided in the conventional technology.

SUMMARY OF THE INVENTION

It is the first object of the invention to provide a recording medium with video index information having a data structure capable of expressing a logic structure inside video information recorded therein.

It is the second object of the invention to provide a recording medium with video index information recorded therein with video retrieval improved by using the video index information having a data structure capable of expressing a logic structure inside the video information.

It is the third object of the invention to provide a technique for user interface making it possible to express a logic structure inside video information, to easily use the video information, to increase the freedom in reproducing the video information, and to improve adaptability of the video information to operation, application, and treatment.

It is the fourth object of the invention to provide a technique for user interface making it possible to raise a freedom in reproducing video information and to easily and effectively use video information.

It is the fifth object of the invention to provide a recording medium with audio index information having a data structure capable of expressing a logic structure of audio information recorded therein.

It is the sixth object of the invention to provide a recording medium with audio index information recorded therein with convenience in audio retrieval improved by using the audio index information having a data structure capable of expressing a logic structure inside audio information.

It is the seventh object of the present invention to provide a technique for user interface making it possible to express a logic structure inside audio information, to easily use the audio information, to raise a freedom in reproducing audio information, and to improve adaptability of audio information to operation, application, and treatment.

It is the eighth object of the present invention to provide a video retrieval method enabling improvement of convenience in video retrieval by using the video index information having a data structure capable of expressing a logic structure inside the video information and applicable to any type of video information.

It is the ninth object of the present invention to provide an audio retrieval method enabling improvement of convenience in audio retrieval using audio index information having a data structure capable of expressing a logic structure inside audio information.

It is the tenth object of the present invention to provide a video retrieval system making it possible to easily retrieve even inside information in video information by using video index information having a data structure capable of expressing a logic structure inside the video information.

The video information management method which uses the video index information according to the present invention is a video information management method which uses the video index information for managing video information by analyzing video information including at least a plurality of frames, generating apart from the video information video index information for managing the video information, and referring to the generated video index information, in which the video index information has a tree structure comprising at least one frame information for managing a given number of successive frames in video information as one unit of information, at least one sound information for managing sounds corresponding to a given range in the video information as one unit of information, at least one segment information for classifying frame information and sound information each as one unit of information and managing the information as a group having desired meanings, and package information for a plurality of segment information as a group each as a structure element object, and further in the tree structure, the segment information manages package information for managing other segment information prepared by using frames and sounds in the same range as that of the frame information and sound information managed by the segment information as a group, and package information is allocated in addition to frame information and sound information under one segment information and video information is managed by using a tree structure of video index information and structure element objects therein.

Further, the video information management method which uses the video index information according to the present invention is a video information management method which uses the video index information for managing video information by analyzing video information including at least a plurality of frames, generating apart from the video information video index information for managing the video information, and referring to the generated video index information, in which the video index information has view information consisting of at least one segment information for managing a range of a given number of successive frames in video information and a link list for segment information indicating in what order the plurality of segment information are to be followed, a plurality of link list each for indicating a desired order for following a required number of segment information are generated, a plurality of view information each corresponding to each link list are set, and video information is managed by using the video index information having a plurality of view information.

Further, with the recording medium with audio index information recorded therein according to the present invention, it is possible to provide a recording medium with the audio index information having a data structure capable of expressing a logic structure inside audio information and enabling improvement of convenience in audio retrieval.

Further, the audio information management method which uses the audio index information according to the present invention is an audio information management method which uses the audio index information for managing audio information by analyzing audio information including at least a plurality of frames, generating apart from the audio information audio index information for managing the audio information, and referring to the generated audio index information, in which the audio index information has a tree structure comprising at least one frame information for managing a given number of successive frames in audio information as one unit of information, at least one sound information for managing sounds corresponding to a given range in the audio information as one unit of information, at least one segment information for classifying frame information and sound information each as one unit of information and managing the information as a group having desired meanings, and package information for a plurality of segment information as a group each as a structure element object, and further in the tree structure, the segment information manages package information for managing other segment information prepared by using frames and sounds in the same range as that of the frame information and sound information managed by the segment information as a group, and package information is allocated in addition to frame information and sound information under one segment information and video information is managed by using a tree structure of video index information and structure element objects therein.

Further, in the video retrieval method using video index information according to the present invention, of the structure element objects, at least one type of structure element objects have retrieval information for retrieving contents of frames and/or sounds directly and indirectly managed by the structure element objects, further the segment information manages package information for managing other segment information prepared by using frames and sounds in the same range as that of the frame information and sound information managed by the segment information, and in the tree structure package information is allocated in addition to frame information and sound information under one segment information, retrieval conditions for a desired video-image (scene) are inputted to identify video index information including retrieval information satisfying the inputted retrieval conditions by retrieving a plurality of video index information previously prepared from a plurality of different video information, and a list for video information corresponding to the identified video index information is outputted as a result of retrieval.

Further, in the video retrieval method which uses the video index information according to the present invention, a structure element object has retrieval information for retrieving information for retrieving contents of frames and/or sounds directly or indirectly managed by the structure element object, and segment information manages package information for managing other segment information prepared by using frames and sounds in the same range as that of the frame information and sound information managed by the segment information, and in the tree structure, package information is allocated in addition to frame information and sound information under one segment information, retrieval conditions for a desired scene are inputted, a structure element object including retrieval information satisfying the retrieval conditions is identified by retrieving video index information, and a list for identified structure element objects is outputted as a result of retrieval.

Further, in the audio retrieval method which uses the audio index information according to the present invention, of the structure element objects, at least one type of structure element objects have retrieval information for retrieving contents of frames and/or sounds directly and indirectly managed by the structure element objects, further the segment information manages package information for managing other segment information prepared by using frames and sounds in the same range as that of the frame information and sound information managed by the segment information, and in the tree structure package information is allocated in addition to frame information and sound information under one segment information, retrieval conditions for desired sounds are inputted to identify audio index information including retrieval information satisfying the inputted retrieval conditions by retrieving a plurality of audio index information previously prepared from a plurality of different audio information, and a list for audio information corresponding to the identified audio index information is outputted as a result of retrieval.

Further, in the audio retrieval method which uses the audio index information according to the present invention, a structure element object has retrieval information for retrieving information for retrieving contents of sounds directly or indirectly managed by the structure element object, and segment information manages package information for managing other segment information prepared by using sounds in the same range as that of sound information managed by the segment information, and in the tree structure, package information is allocated in addition to sound information under one segment information, retrieval conditions for a desired scene are inputted and structure element object including retrieval information satisfying the retrieval conditions is identified by retrieving audio index information, and a list for identified structure element objects is outputted as a result of retrieval.

Further, the video retrieval system according to the present invention is a video retrieval system comprising a plurality of video information databases, a plurality of video index information databases, a retrieval information delivery file, and a retrieval device, and when retrieval conditions for a desired scene are inputted, the retrieval device identifies retrieval information coincident or similar to the retrieval conditions, and outputs the required video information according to video index information including the retrieval information as a result of retrieval. Therefore, it is possible to provided a video retrieval system in which retrieval reflecting even internal information of video information can easily be executed by using video index information having a data structure capable of expressing a logic structure inside the video information.

Other objects and features of this invention will become apparent from the following description with reference to the accompanying drawings.

BRIEF DESCRIPTION OF THE DRAWINGS

FIG. 9 is an explanatory view showing video index information corresponding to two video information (Movie 1 and Movie 2) each as an object for retrieval;

FIG. 10 is an explanatory view showing an example of retrieval conditions (Conditions 1 to 5) in Application 3 of Embodiment 1;

FIG. 11 is an explanatory view showing one example of a result of retrieval when each retrieval item in each of the conditions shown in FIG. 10 is retrieved by means of AND condition in Application 3 of Embodiment 1;

FIG. 12 is an explanatory view showing an example of a result of retrieval when each retrieval item in each of the conditions shown in FIG. 10 is retrieved by means of OR condition in Application 3 of Embodiment 1;

FIG. 13 is an explanatory view showing an example of a result of retrieval when one of retrieval items in each of the conditions shown in FIG. 10 is weighted twice and each retrieval item is retrieved by means of AND condition in Application 3 of Embodiment 1;

FIG. 14 is an explanatory view showing an example of a result of retrieval when one of retrieval items in each of the conditions shown in FIG. 10 is weighted 2 times and each retrieval item is retrieved by means of OR condition in Application 3 of Embodiment 1;

FIG. 15 is an explanatory view showing an example of a result of retrieval when one of retrieval items in each of the conditions shown in FIG. 10 is weighted 3 times and each retrieval item is retrieved by means of OR in Application 3 of Embodiment 1;

FIG. 16 is an explanatory view showing an example of retrieval including positional information indicating a position where retrieval information satisfying the retrieval conditions exists in Application 3 of Embodiment 1;

FIG. 18 is an explanatory view showing an example of definition of a hierarchy level in a direction of depth in a tree structure of video index information in Application 4 of Embodiment 1;

FIG. 19 is an explanatory view showing another example of definition of a hierarchy level in a direction of depth in a tree structure of video index information in Application 4 of Embodiment 1;

FIG. 21 is an explanatory view showing an example of a result of retrieval of structure element objects in video index information in Application 4 of Embodiment 1;

FIG. 24 is an explanatory view showing video index information corresponding to two video information (Movie A, Movie B) each as an example of a retrieval object;

FIG. 25 is an explanatory view showing an example of retrieval conditions according to Embodiment 4 of the present invention;

FIG. 26 is an explanatory view showing an example of a result of retrieval when retrieval is executed by using the conditions shown in FIG. 25 in Embodiment 4 of the present invention;

FIG. 28 is an explanatory view showing an example of a result of retrieval when the video retrieval method which uses the video index information according to Embodiment 5 of the present invention is used;

DESCRIPTION OF THE PREFERRED EMBODIMENTS

Detailed description is made for a recording medium with image index information recorded therein, a video information management method which uses the video index information, a recording medium with audio index information recorded therein and an audio information management method which uses the audio index information, a video retrieval method which uses the video index information, an audio retrieval method which uses the audio index information, and a video retrieval system each according to the present invention with reference to the attached drawings in the order from Embodiment 1 to Embodiment 9.

In the video information management system which uses the video index information according to Embodiment 1 of the present invention, an object for management is video information including movies, sounds like that in broadcast information or video information, and a video index information for managing the video information is generated in addition to the video information by analyzing video information including at least a plurality of frames. This video index information has a tree structure basically comprising frame information, sound information, segment information, and package information each as a structure element object, and manages video information using a tree structure of video index information generated as described above and structure element objects therein.

Further, as described later, an arbitrary attribute object can be located in the tree, and required data can be maintained in correlation to the structure element object by using this attribute object. By setting retrieval information for retrieving contents of frames and/or sounds directly and indirectly managed by each structure element object, detailed retrieval of video information structured can easily be executed by referring to the video index information.

A video information management method which uses the video index information according to Embodiment 1 of the present invention will be explained in the following order:
1) Data structure of the video index information according to Embodiment 1;
2) Method of generating the video index information according to Embodiment 1;
3) Application 1;
4) Application 2 (Video retrieval method which uses the video index information)
5) Application 3 (Video retrieval method which uses the video index information), and
6) Application 4 (Video retrieval method which uses the video index information)

Figure 1:
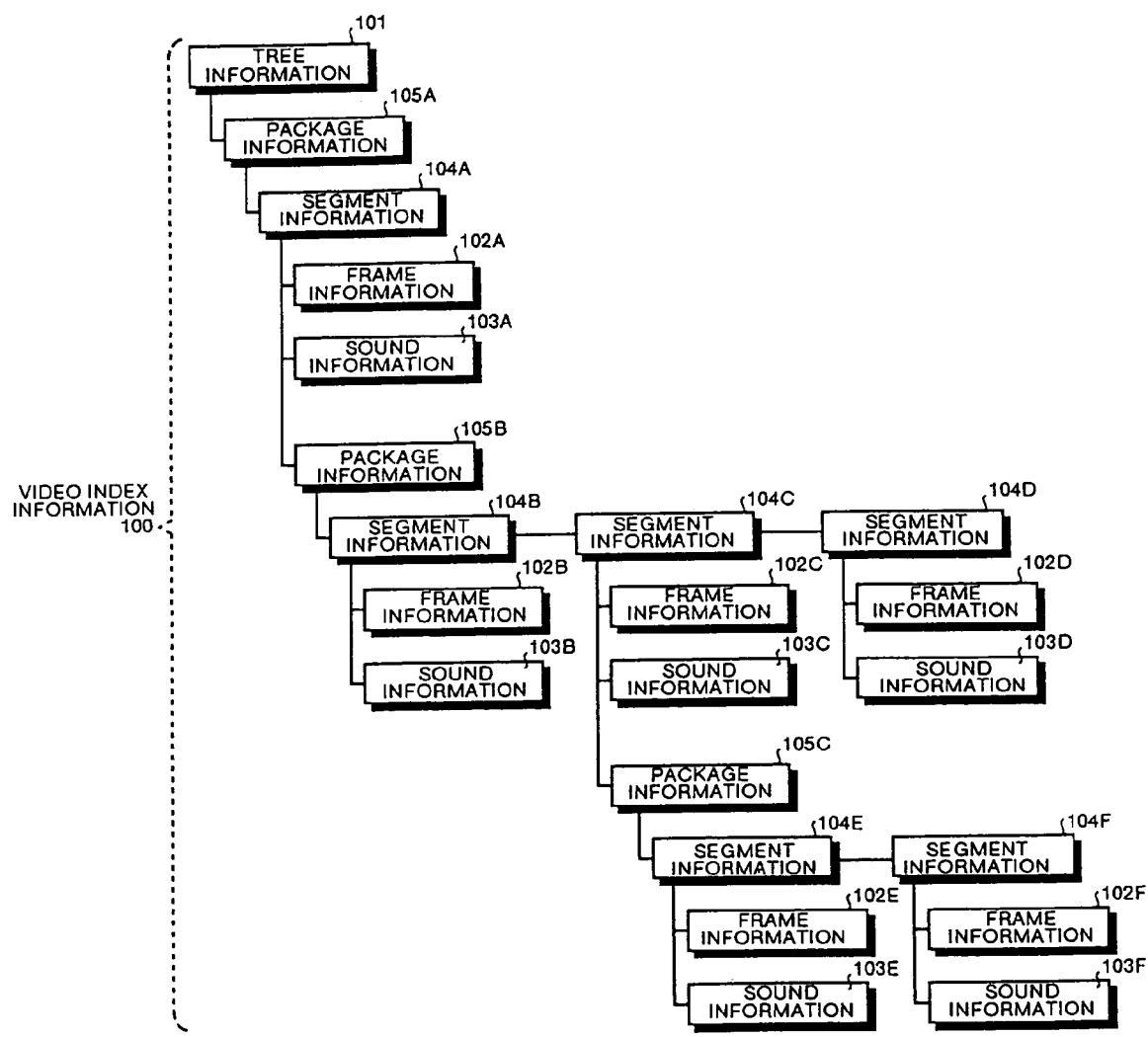
FIG. 1 is an explanatory view showing a data structure of video index information in a video information retrieval method which uses the video index information according to Embodiment 1 of the present invention.

1) Data Structure of Video Index Information According to Embodiment 1 of the Present Invention FIG. 1 is an explanatory view showing a data structure of the video index information. Video index information 100 has a tree structure in which a plurality of structure element objects are arranged in a multi-layered form as shown in this figure, and this image index information 100 itself can be treated as one data file (index file). Accordingly, the video index information 100 can be stored together with video information, or can be separated from video information and stored separately.

A structure element object in the video index information 100 comprises tree information 101, frame information 102 (102A to 102F), sound information 103 (103A to 103F), segment information 104 (104A to 104F), and package information 105 (105A to 105C).

The tree information 101 is information set at the top of the tree structure of one video index information, and all of structure element objects relating to one video information are arranged in a layer just below this video index information layer. In other words, the tree information indicates an entrance for one video index information. A package information 105A indicating video information (sounds and moving pictures) as a whole is arranged under this tree information 101, and a segment information 104A indicating video information as a whole is allocated below this package information 105A.

The frame information 102 is the information for managing a given number of successive frames in video information as one unit of information, and has a node ID in a tree structure, a range of successive frames managed by the frame information, and a pointer for pointing a position in video information.

The sound information 103 is the information for managing sounds corresponding to an arbitrary range in video information, a node ID in a tree structure, an arbitrary range for managing managed by this sound information, and a pointer indicating a position in the video information.

The segment information 104 is the information for classifying the frame information 102 and the sound information 103 each as one unit of information and managing the information as a group having desired meanings, and at the same time is the information for managing the package information 105 for managing a plurality of other segment information prepared by using frames and voices in the same range as that of the frame information 102 and sound information 103 managed by the segment information 104. It should be noted that the segment information 104 has identifying information for identifying frame information, sound information, package information managed by the segment information 104, and a pointer to the upper package information 105 to which the segment information belongs.

For instance, as shown in this figure, the segment information 104A is the information for managing the frame information 102A, sound information 103A and package information 105B, and has a node ID for the segment information 104A, identifying information for identifying the frame information 102A, sound information 103A, and package information 105B, and a pointer to upper package information 105A to which the segment information 104A belongs.

The package information 105 is the information for managing a plurality of segment information 104 as a group, and has a node ID in a tree structure, a list for segment information 104 managed by the package information, and a pointer to the upper segment information 104 to which the package information 105 belongs.

For instance, as shown in this figure, the package information 105B is the information for managing three segment information 104B to 104D as a group, and has a node ID in a tree structure, a list for segment information 104B to 104C managed by the package information 105B, and a pointer to upper segment information 104A to which the package information 105B belongs.

As described above, in a tree information of the video index information 100 comprising a plurality of structure element objects, the package information 105 can be placed under one segment information 104 in addition to the frame information 102 and sound information 103.

In a tree structure of the video index information 100, a given number of attribute objects can be allocated. Each of the structure element objects in the video index information 100 (tree information 101, frame information 102, sound information 103, segment information 104, and package information 105) has a pointer to an attribute object. An additional information can be added to any structure element object utilizing the attribute object as well as with a pointer to an attribute object.

Figure 2:
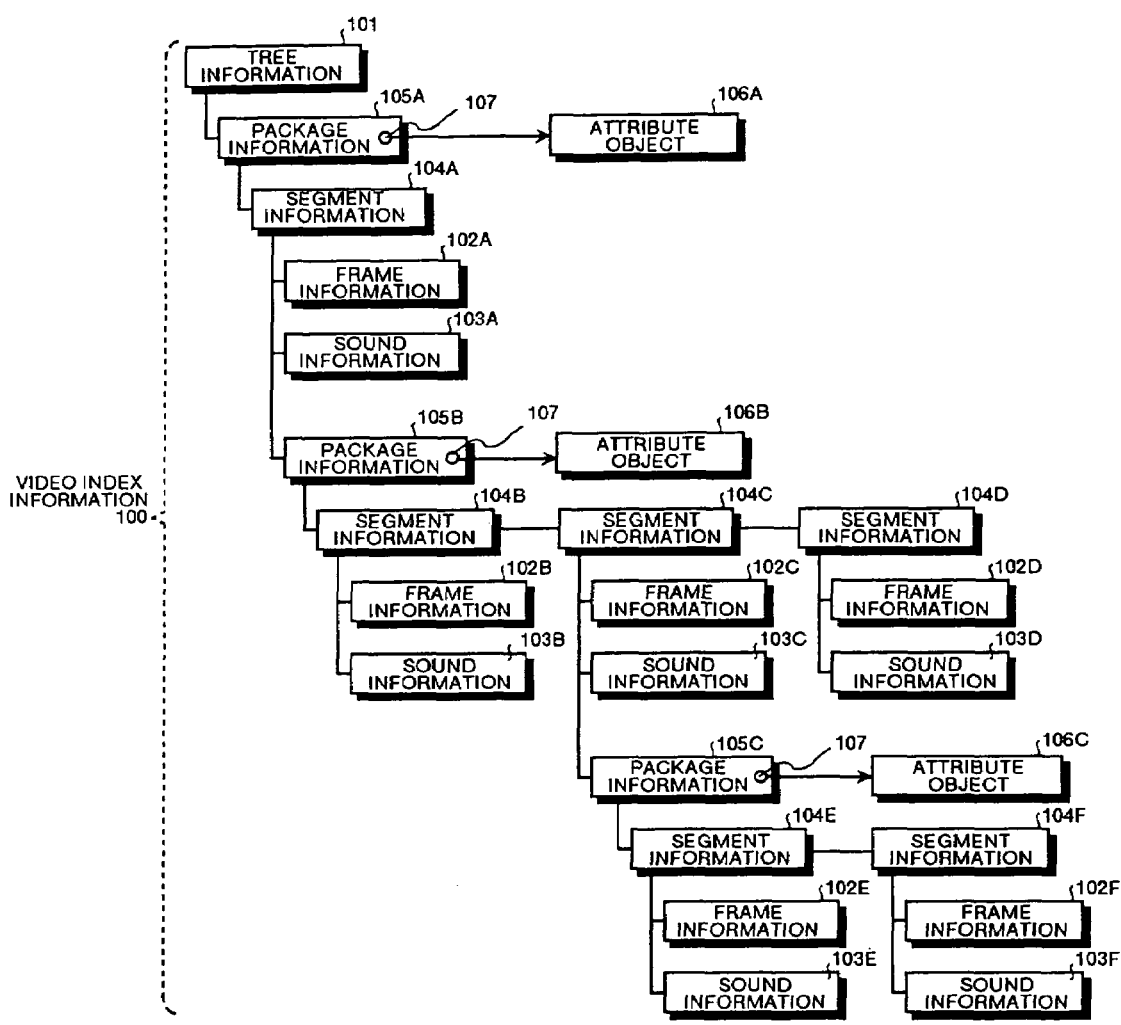
FIG. 2 is an explanatory view showing an example in which an attribute object is allocated in a tree structure, of video index information according to Embodiment 1.

FIG. 2 is an example in which an attribute object is allocated in a tree structure of the video index information 100. Further, FIG. 2 shows a case in which an attribute object 106 (attribute objects 106A to 106C) is allocated in a layer below the structure element object (herein package information 105A to 105C) to which additional information is to be added, and a pointer 107 to a corresponding attribute object 106 is set in each respective structure element object. There is no specific restriction over a place where the attribute object 106 can be allocated, and for instance, the configuration is allowable in which only attribute object 106 is collected at a specific site in the tree structure and each structure element object can be linked via the pointer 107 to the corresponding attribute object 106.

2) A Method of Generating the Video Index Information According to Embodiment 1

A method of generating the video index information 100 by analyzing the video information is explained below.

The segment information 104 in the video index information 100 expresses succession of frames and a block of successive sounds in divided video-image (moving pictures, sounds) and can be defined as one unit of information for a structured image. Also one lengthy video information can be regarded at first as a block, and exists as one segment information 104A (Refer to FIG. 1). Segment information 104 other than the segment information 104A is a portion of parent segment information 104 obtained by dividing it. For instance, each of the segment information 104B to 104D is a portion of the parent segment information 104A obtained by dividing it, while each of the segment information 104E and 104F is a portion obtained by dividing the parent segment information 104C.

When the parent segment information 104 (for instance, segment information 104C) is divided into a plurality of portions, it may be said that the package information 105 manages the plurality of segment information 104 each as a portion of the mother segment information 104 (herein, segment information 104E and 104F) as a group.

In Embodiment 1, when video index information 100 is to be generated by analyzing the video information, at first it is necessary to analyze the video information. There are various types of analyzing methods depending upon how the video information is going to be used. For instance, there may be a method in which video information is analyzed by simply giving attention to the background color, or a method in which analysis is made by giving attention to the movement, or a method in which analysis is made by checking presence of a particular object, or a method in which analysis is made by means of simple time division and the like. In other words, analysis of video information can freely be made by applying algorithm prepared according to for what the video information is going to be used (algorithm corresponding to an application), and there is no specific restriction for the analysis method. Further, an operator is not required to depend on any specific algorithm for analysis, and may manually input a result of analysis by directly checking the video information.

A method in which the video information is analyzed by giving attention to the background color and the video index information 100 generated by using a result of analysis is explained below.

Figure 3A:
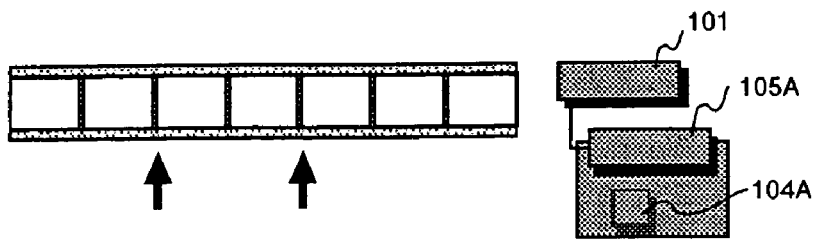
FIG. 3A to FIG. 3C are explanatory views showing a method of generating the video index information in Embodiment 1.
Figure 3B:
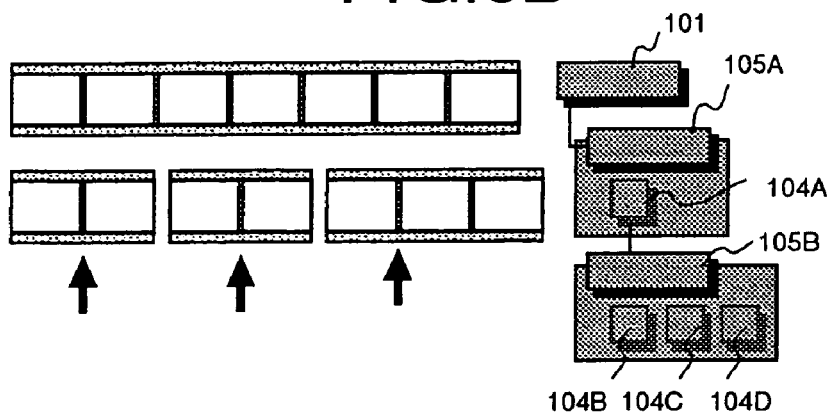
Figure 3C:
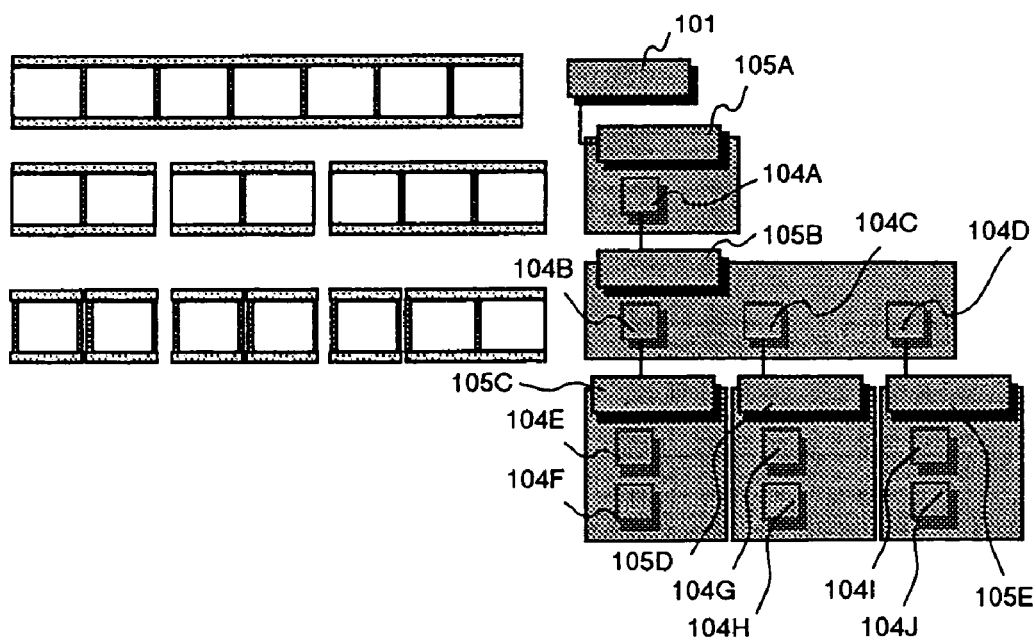

FIG. 3A to FIG. 3C are explanatory views each showing a relation between the segment information 104 and package information 105 when a tree is divided to segments in two stages. It should be noted that a right side of these figures shows a tree structure and a left side of the figure shows a state of the corresponding video information expressed with succession of frames. It should be noted that this stage of video information expresses the frame information 102 and sound information 103 in the video index information 100 with an abstract image, and that this stage does not show an actual state of video information (original video information).

As shown in FIG. 3A, the initial video information is not structured at all, so that, as a tree structure of the video index information 100, there exist only the tree information 101, one package information 105 and segment information 104 in a tree structure of the video index information 100. Namely, one package information 105A indicating video information as a whole (voices, sounds and moving pictures) is allocated under the tree information 101 declaring an entrance for one video index information 100, and one segment information 104A indicating the entire video information is allocated under this package information 105A. By applying an algorithm for detecting changes in the background color to the video information in this state and dividing the video information (successive frames) at the section indicated by an arrow in the figure, a tree structure in the state shown in FIG. 3B and the state of frames of the video information are generated.

In the right side of FIG. 3B, three segment information 104B to 104D are generated by division under the segment information 104A, so that the tree has been structured as shown in this figure. It should be noted that these three segment information 104B to 104D are grouped under the package information 105B and managed by the segment information 104A.

Herein by applying the same algorithm as that described above and setting parameters in smaller steps to divide the video information at the sections indicated by the arrows in the left sections in FIG. 3B, the tree structure and frames of the video information as shown in FIG. 3C are obtained.

As shown in FIG. 3C, lower package information 105C to 105E are prepared to the segment information 104B to 104D as shown in the right side of FIG. 3C with the divided segment information 104E, 104F stored in the package information 105C, the divided segment information 104G, 104H stored in the package information 105D, and further the divided segment information 104I, 104J stored in the package information 105E. The prepared tree structure is structured with smaller steps in the lower layers by extracting scenes according to changes in the background (with an algorithm for detecting changes in the background colors).

It should be noted that the frame information 102 and segment information 104 each corresponding to the segment information 104 are detected by a detection module, and are maintained under the corresponding segment information 104 in the tree structure as shown in FIG. 1.

When each segment information 104 and package information 105 are generated, desired information may be generated as additional information (for instance, retrieval information) according to a purpose and by using the attribute object 106 so that the additional information is used for retrieval or other purposes later. More specifically, keywords or the like expressing features of each structure element object can be set for use in retrieval or classification later.

As described above, by dividing the segment information 104, lower package information 105 may be generated, and also by registering the frame information 102 and sound information 103, the video index information 100 can be generated.

The index information 100 generated as described above is provided as a tree structure shown, for instance, in FIG. 1. As clearly understood from the description above, the video index information 100 expresses structure of the corresponding video information by dividing the video information into segments just like a document divided into chapters, clauses, sections, or the like for structuring. Thus, by using the segment information 104 and package information obtained by dividing the entire video information, desired frame information 102 or desired sound information 103 can be retrieved. Further, only required structure element objects can be made visible or audible by specifying particular structure element objects in a tree structure.

A case where the video index information 100 is generated by analyzing the same video information with different algorithms and a case where a plurality of package information are generated by dividing the same video information in different ways will be explained with reference to FIG. 4A to FIG. 4C.

Figure 4A:
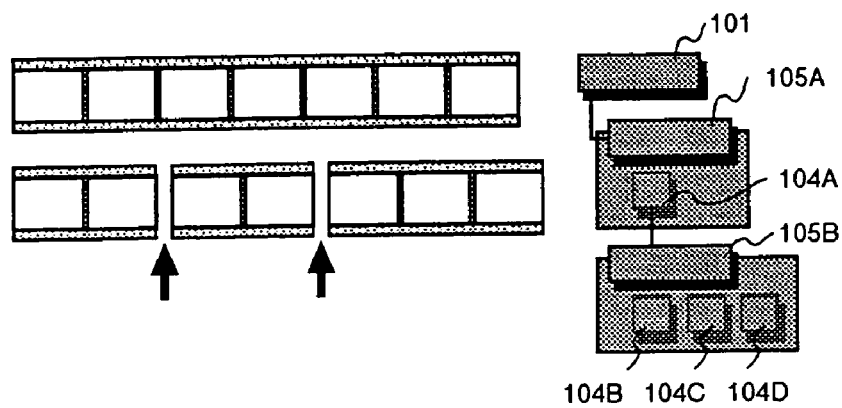
FIG. 4A to FIG. 4C are explanatory views showing a case where video index information is generated by applying different algorithms to the same video information for analysis, or a case where a plurality of package information are generated by dividing the same video information in different ways.

As shown in FIG. 4A, the segment 104A is divided at sections indicated by the arrows into three segment information 104B to 104D by applying the first algorithm to generate the package information 105B. Next, as shown in FIG. 4B when the package information 105B is generated by dividing, the segment information 104A at positions indicated by arrows into two segment information 104E and 104F by applying the second algorithm, then the video index information 100 as a tree structure is obtained in, as shown in FIG. 4C, which two package information 104B and 105C are allocated under the segment information 104A.

Figure 4B:
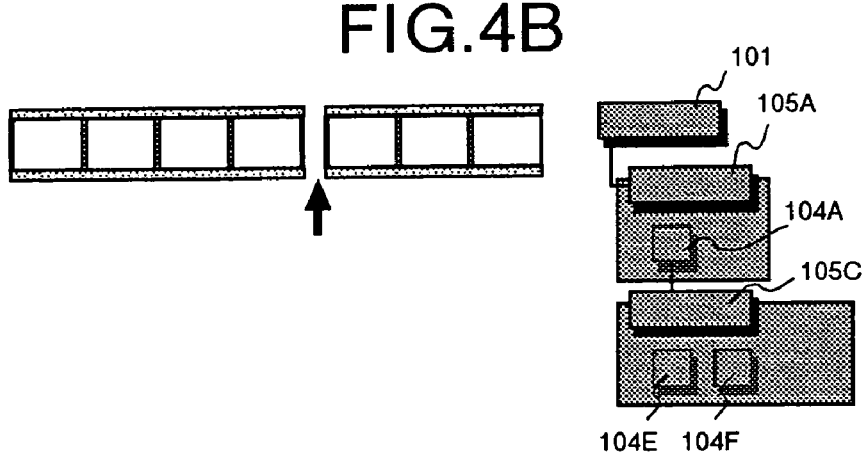

It should be noted that the operations shown in FIG. 4A and FIG. 4B may be executed successively or may be executed at the same point of time as different works. Namely, the video index information has a tree structure, and it is not the actual video information to be processed, so that even operations to the same segment information 104 (for generation of a lower tree structure of the corresponding segment information 104) may be executed by different operators at different locations at the same time. This means that there is no specific restriction over the operations. The video index information 100 generated by a plurality of operators may be merged under one tree information 101 for efficient management on the condition that the video information are identical.

Figure 4C:
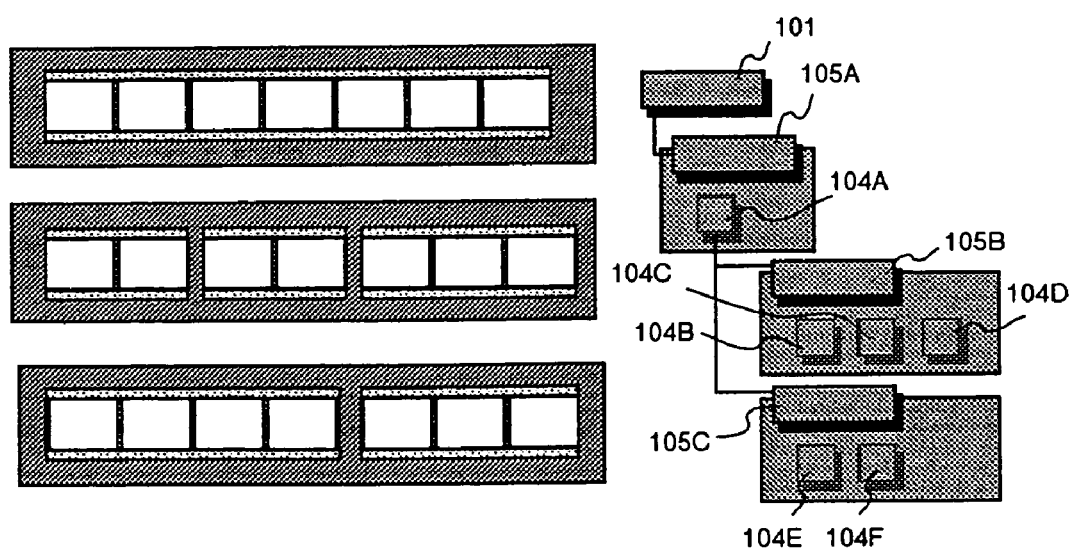

Further, the state shown in FIG. 4C can be recognized as a state where two types of video index information 100 generated by applying two different algorithms are merged under one tree information 101.

3) Application 1

Figure 5:
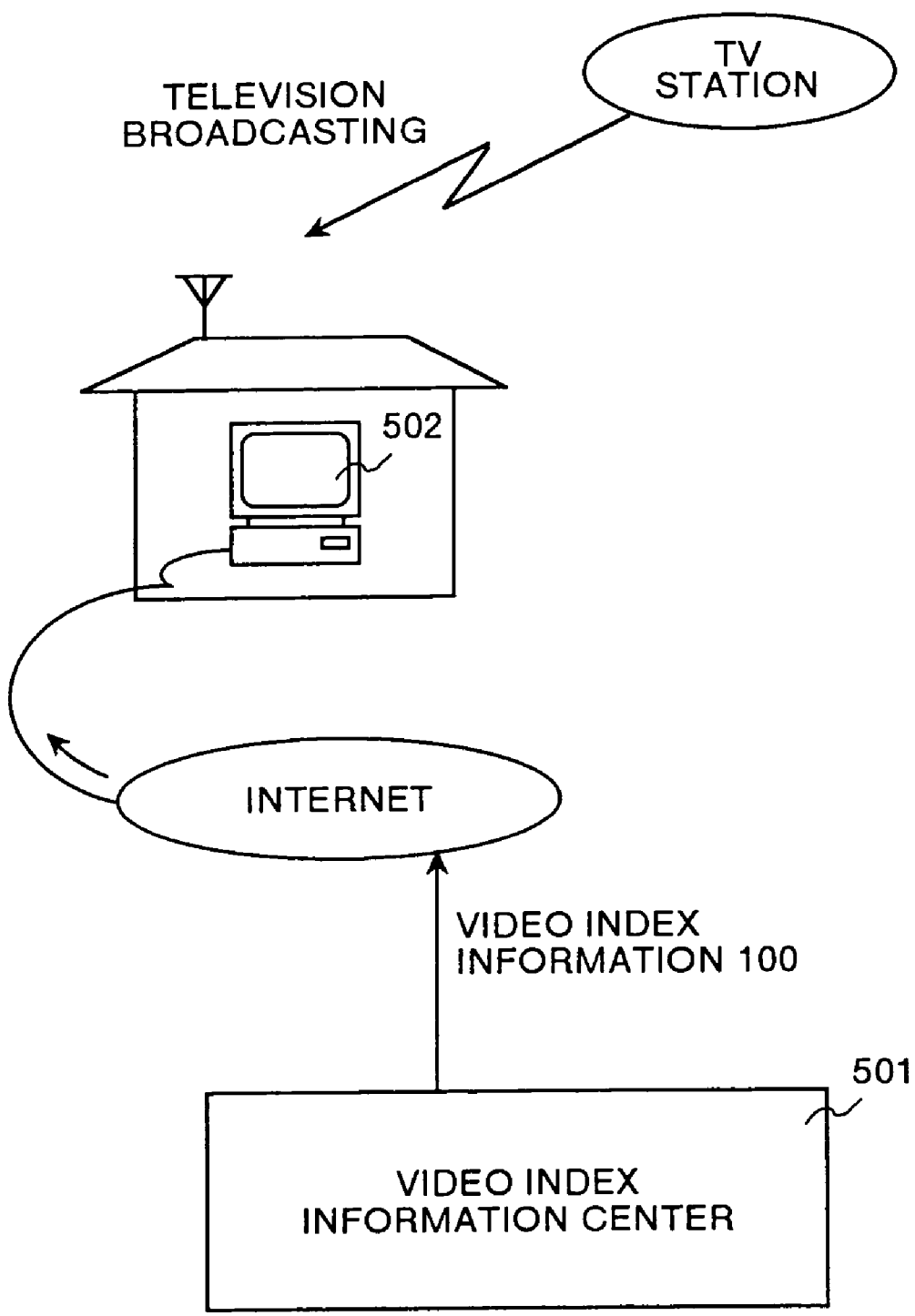
FIG. 5 is an explanatory view showing Application 1 of Embodiment 1.

An application in which the video information management system which uses the video index information according to Embodiment 1 of the present invention is concretely applied is explained here. FIG. 5 is an explanatory view showing the Application 1. In this Application 1, by making use of the fact that the video index information 100 and actual video information can be separated from each other, the video index information 100 is distributed via the Internet to a dedicated terminal 502 from a center 501 before the video information is actually transmitted for television broadcasting or the like. Or, in a channel dedicated for broadcasting time tables for programs, it is possible to broad cast video index information together with the time tables. At the terminal 502, an operator can prescribe for video recording by selecting only sections to be recorded by using the video index information 100 so that only required sections will be recorded when the video information is actually broadcast. An operator can record video information and reproduce only desired sections by using the video index information 100 previously received.

4) Application 2 (Video Retrieval Method which Uses the Video Index Information)

Figure 6:
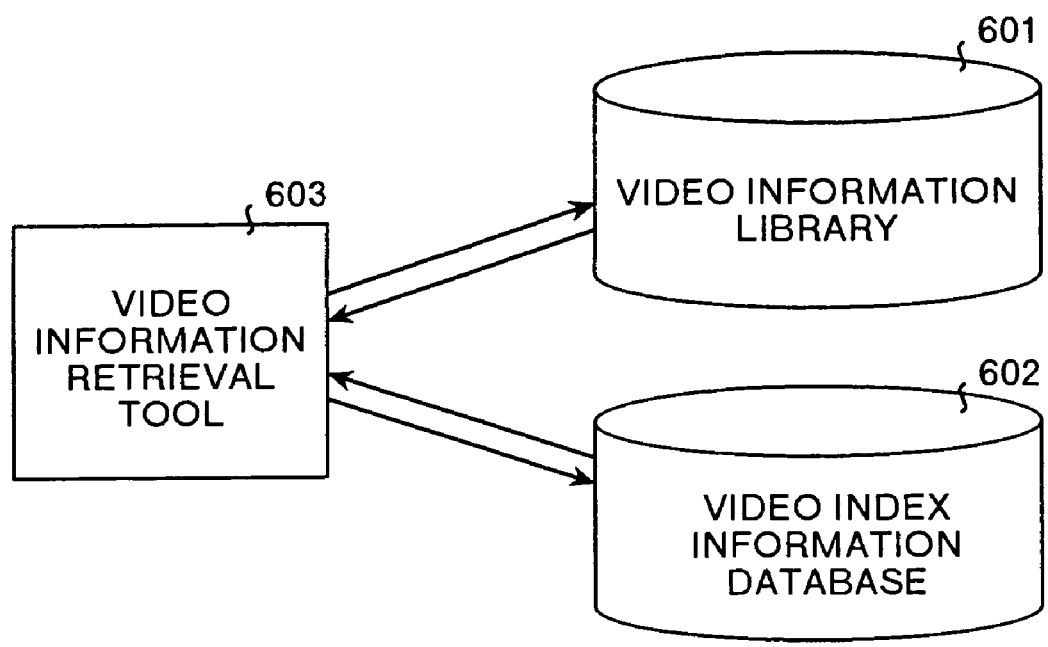
FIG. 6 is an explanatory view showing Application 2 of Embodiment 1.

FIG. 6 is an explanatory view showing Application 2 (a video retrieval method which uses the video index information according to the present invention). Application 2 is a case where the video index information 100 is applied to a video information retrieval tool. In this Application 2, by using a video information library 601 with a plurality of video information stored therein, a video index information data base 602 with a plurality of video index information corresponding to video information stored in the video index information 601, and a dedicated video information retrieval tool 603 using video index information, for instance, when a service for archiving videos broadcast in the past and reusing the videos when required or the like is realized, for instance, at a television station, required scenes can be retrieved not only by retrieving titles, but also by retrieving even information concerning contents of video information such as "a scene in which . . . appears and talks with . . . ", "an image including a scene similar to this one", "a scene in which this music is used" or the like. It is needless to say that, in this case, various keywords should preferably be set with minute steps as retrieval information in the attribute object 106 previously.

Also in telerecording reflecting viewer's desire, for instance, specification such as "all scenes where Clinton appears" can be made, or such a specification as "Telerecord only information concerning stock prices provided in news programs" can be made for collecting only desirable information, and further such a specification as "Switch to Channel XX when Ozaki starts tee shot for changing a channel to get desired information, and also "I want to browse this movie within around 5 minutes" for preparing a digest version to satisfy viewers' demands.

Incidentally, the image information retrieval tool 603 reads the image index information from the image index information database 602 (by loading in the memory) and executes the retrieval processing. Even if the image index information has a data corresponding to the structure of the image information, only a required minimal information (retrieval information) may be taken as the target for retrieval in order to speed up the processing.

5) Application 3 (Video Retrieval Method which Uses the Video Index Information)

Application 3 (video retrieval method which uses the video index information according to the present invention) is a case where desired video information satisfying retrieval conditions is retrieved from a plurality of retrieval conditions by referring to the video index information previously prepared in correlation to each video information.

In the video retrieval method which uses the video index information in Application 3, an object for retrieval is video information including moving pictures, sounds such as those in broadcast information or video information, and in this method, video index information for managing video information is previously prepared apart from the video information, and the prepared video index information is directly retrieved. This video index information has a tree structure basically comprising frame information described later, sound information, segment information, and package information each as a structure element object, and video information is retrieved by using the tree structure and structure element objects of the video index information prepared as described above.

Figure 7:
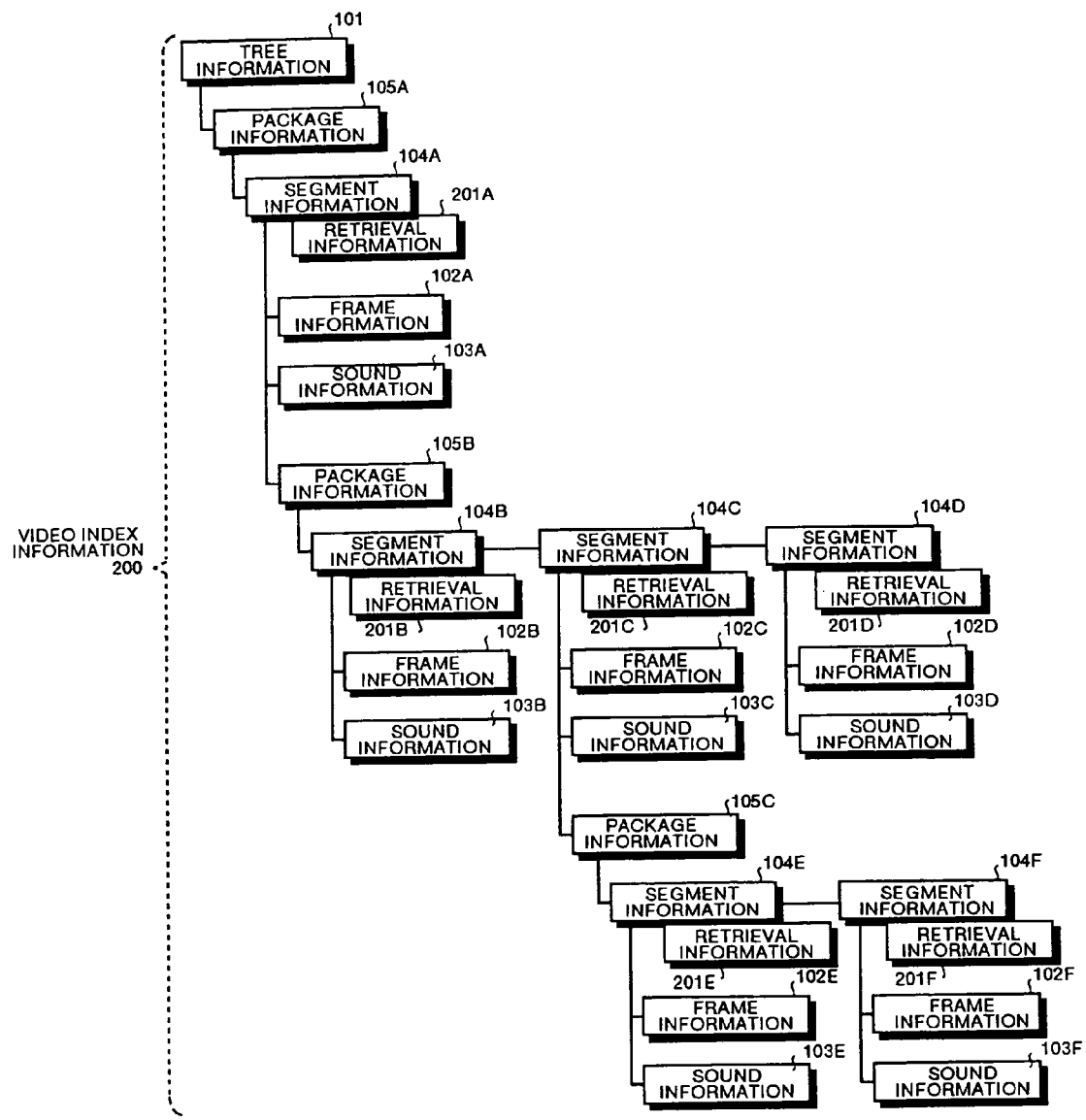
FIG. 7 is an explanatory view showing a data structure of the video index information used in Application 3 of Embodiment 3.

FIG. 7 is an explanatory view showing a data structure of video index information 200 used in Application 3. It should be noted that the same reference numerals are assigned to the same components as those of the video index information 100 according to Embodiment 1 shown in FIG. 1 and detailed description thereof is omitted herein.

The video index information 200 has frame information 102, sound information 103, segment information 104, and package information 105 each as a structure element object in a tree structure with the tree information 101 at the top (entrance).

Of the structure element objects, assigned to the segment information 104 are retrieval information 201 (201A to 201F) for retrieving contents of the frame information 102 and sound information 103 existing under the segment information 104. The tree information 101 includes basic information indicating a time required for replay of video information (entire stream) corresponding to the video index information 200 and a format thereof. This information may also be used as retrieval information.

Figure 8:
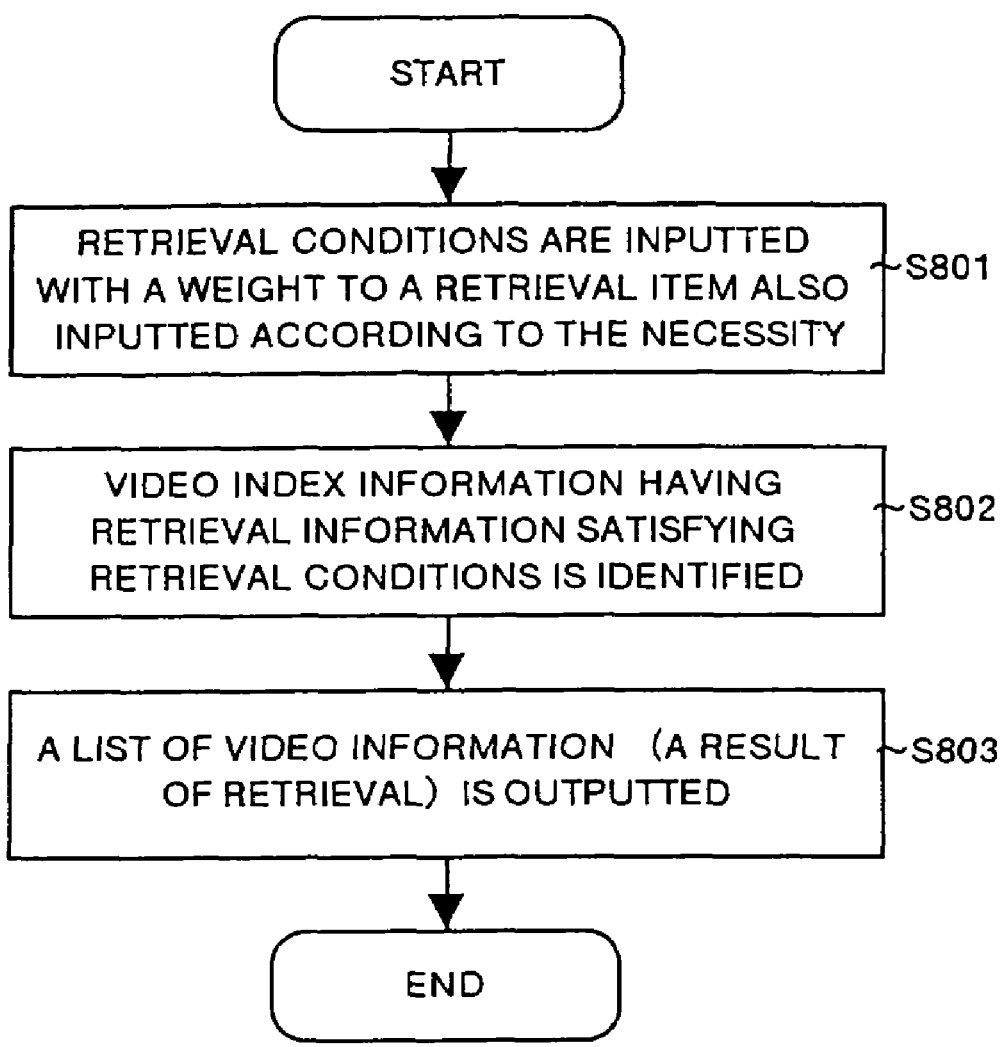
FIG. 8 is a general flow chart showing video retrieval processing in Application 3 of Embodiment 1.

FIG. 8 is a general flow chart for video retrieval processing in Application 3 (video retrieval method which uses the video index information according to the present invention). As for the system configuration, a video information library 601 with a plurality of video information stored therein as shown in FIG. 6, a video index information database 602 with a plurality of video index information (herein, video index information 200) corresponding to each video information in the video index information 601, and a dedicated video information retrieval tool 603 which uses the video index information are used.

At first, retrieval conditions for a desired video and weights for retrieval items each constituting the retrieval conditions are inputted according to the necessity (step S801). Then video index information including retrieval information satisfying the retrieval conditions is identified by retrieving a plurality of video index information 200 previously prepared from a plurality of different video information (step S802), and a list for video information corresponding to the identified video index information is outputted as a result of retrieval (step S803).

Next detailed description is made for the video retrieval processing with reference to retrieval conditions and a result of retrieval (list). There may be one or more video information to be retrieved (in other words, video index information 200), but it is assumed herein for simplifying description that there are two video information (Movie 1, Movie 2). FIG. 9 shows video index information 200A and 200B corresponding to the two video information (Movie 1, Movie 2).

The video index information 200A, 200B have a tree structure in which one package information is allocated under the tree information, three segment information (and retrieval information) are allocated under the package information, and frame information and sound information are allocated under the segment information.

To the video index information 200A in which Movie 1 is structured, as described below, "replay time, format" is added to the tree information and "replay zone in a segment (a range of replay time), key frame ID (representative frame), person appearing" are added to other three segment information respectively each as retrieval information.

Movie 1:
Tree (retrieval information in the tree information)
 Replay time: 00:30:00
 Format: MPEG2
Segment #1 (Retrieval information for the segment information)
 Replay zone in segment: 00:00:00-00:15:00
 Key frame ID: 0
 Person appearing: A, B Segment #2 (Retrieval information for the segment information)
 Replay zone in segment: 00:15:00-00:20:00
 Key frame ID: 27000
 Person appearing: A, C
Segment #3 (Retrieval information for the segment information)
 Replay time in segment: 00:20:00-00:30:00
 Key frame ID: 36000
 Person appearing: C, B In the video index information 200B in which Movie 2 is structured, as shown below, "replay time, format" is added to the tree information, and replay time in segment, key frame ID (representative frame), and person appearing are added to other three segment information respectively.

Movie 2:
Tree (retrieval information in the tree information)
 Replay time: 00:10:00
 Format: MPEG1
Segment #1 (Retrieval information for the segment information)
 Replay zone in segment: 00:00:00-00:03:00
 Key frame ID: 0
 Person appearing: D, E
Segment #2 (Retrieval information for the segment information)
 Replay zone in segment: 00:03:00-00:05:00
 Key frame ID: 5400
 Person appearing: A, E
Segment #1 (Retrieval information for segment information)
 Replay zone in segment: 00:05:00-00:10:00
 Key frame ID: 9000
 Person appearing: C, E However, retrieval information for the video index information 200 is not limited to the above items, and for instance, such contents as a title of a music piece, a tone, or a voice in sounds identified according to the sound information present under the segment information or the like may be set, and further such contents as a particular matter, a color, a location, an image or the like present in a scene identified by the frame information may be set.

Next it is assumed that, as retrieval conditions for retrieving a desired scene, retrieval conditions consisting of conditions 1 to 5 each having three retrieval items as shown in FIG. 10 are given. It is assumed herein that, under the retrieval conditions, relations among retrieval items for replay time, format, and person appearing can be defined using AND, and OR like in the general Boolean expression for retrieval.

For instance, in the conditions 1 to 5, when each retrieval item is retrieved using AND, the retrieval condition is as expressed by the expression (1) below, and a list as a result of retrieval is as shown in FIG. 11.

(relay time) AND (format) AND (Person appearing)　　(1).

As shown in FIG. 11, as a result of retrieval, conditions (conditions for retrieval), a result of retrieval under the conditions, a score given to a result of retrieval, and retrieved contents are outputted. For instance, when retrieval is executed under the condition 1, Movie 2 is retrieved, and the score is 1 (coincident contents: Coincidence of a Person appearing occurred once). When retrieval is executed under the condition 2, Movie 1 and Movie 2 are retrieved, and a score for Movie 1 is 2 (Coincident contents; Coincidence of a Person appearing occurred twice), while a score for Movie 2 is 1 (Coincident contents: Coincidence of a Person appearing occurred once). As indicated by the condition 2, when there are a plurality of corresponding video information, the video information are outputted according to the scores in the ranking order (in the descending order of scores). As described above, by outputting video information in the ranking order, a user can determine a video-image closest to a desired video-image from the ranking.

Under the conditions 1 to 5, when each retrieval item is retrieved by means of OR, the retrieval condition is as expressed by the expression (2), a list for a result of retrieval is as shown in FIG. 12.

(replay time) OR (format) OR (Person appearing)     (2)

As shown in FIG. 12, as a result of retrieval, conditions (retrieval conditions), a result of retrieval under the retrieval conditions, and a score given to a result of retrieval, and retrieved coincident contents are outputted. For instance, when retrieval is executed under the condition 3, Movie 1 and Movie 2 are retrieved, a score for Movie 1 is 2 (Coincident contents: Coincidence of a Person appearing occurred twice), while a score for Movie 1 is 1 (Coincident contents; Coincidence of a replay time occurred once, and coincidence of a Person appearing occurred once). Also when retrieval is executed under the condition 5, Movie 2 and Movie 1 are retrieved, and a score for Movie 2 is 3 (Coincident contents: Coincidence of a replay time occurred once, coincidence of a format occurred once, and coincidence of a Person appearing occurred once), while a score for Movie 1 is 2 (Coincident contents: Coincidence of a Person appearing occurred twice). Also herein, where there are a plurality of corresponding video information, the video information are outputted according to the scores in the ranking order (in the descending order of scores herein). In addition to output in the ranking order, the coincident contents is outputted, so that a user can determine a video-image closest to a desired one from the ranking and further can select a video-image in which the most important retrieval item matches according to the coincident contents.

Further in Application 3 (video retrieval method which uses the video index information according to the present invention), it is possible to independently give a weight to each of retrieval items for the conditions 1 to 5. Accordingly, by giving a weight to important retrieval items, a video-image desired by a user can easily be retrieved. Further, a score assessed according to a weight for each retrieval item is given to each video information on a list outputted as a result of retrieval.

When a person appearing as one of retrieval items is weighted twice, and each of the conditions 1 to 5 is retrieved by means of AND, a list for a result of retrieval is as shown in FIG. 13.

Also when a person appearing as one of retrieval items is weighted twice, and each of the conditions 1 to 5 is retrieved by means of OR, a list for a result of retrieval is as shown in FIG. 14.

As clearly understood when FIG. 13 and FIG. 14, in each of which one of retrieval items is weighted twice, are compared to FIG. 11 and FIG. 12 in which no difference is introduced in weighting each of retrieval items, non-uniformity of scores on a list showing a result of retrieval becomes large in FIG. 13 and FIG. 14, so that comparison on a list become easier. In other words, a retrieval item, which a user regards as important, can be reflected to the score, so that it becomes easier to retrieve a desired video-image (scene).

More specifically, as indicated by a score for the condition 5, the rank of Movie 2 is higher than that of Movie 1 as shown in FIG. 12, but in FIG. 14, the two have the same rank, which indicates that the user's desire and intention are reflected better. As there are two video information each as an object for retrieval in Application 3, so that reversion of ranks of the two objects is hard to recognize, but when tens of video-images are ranked on a list as a result of retrieval, change of ranking order due to weighting is large, and appropriate video-images (scenes) are provided with upper ranks.

By making a weight larger, it becomes possible to change the ranking and to allocate a desired video-image at a higher position in the ranking. For instance, when a person appearing is weighted 3 times and each of the conditions is retrieved by means of OR respectively, the list for a result of retrieval is as shown in FIG. 15.

When referring to a score for the condition 5 in FIG. 15, it is understood that, although a rank of Movie 2 is higher than that of Movie 1 in FIG. 12, the two has the same rank in FIG. 14, and the ranks of Movie 1 and Movie 2 have been reversed in FIG. 15.

Further in Application 3, as retrieval information is added to segment information in the video index information, it is possible to output each video information on a list outputted as a result of retrieval with positional information identifying a desired video-image according to segment information having retrieval information satisfying the retrieval conditions.

For instance, when Movie 1 and Movie 2 are objects for retrieval, retrieval is executed under the condition of "A scene in which a person A or a person E appears", and positional information (information identifying segment information having retrieval information satisfying the retrieval conditions) is added to a list for a result of retrieval, the output is as shown in FIG. 16.

In FIG. 16, the rank of Movie 2 is higher than that of Movie 1, and further positional information as information identifying segment information having retrieval information satisfying retrieval conditions in Movie 2 is ranked and outputted together with a score thereof (segment score). Therefore, a user can retrieve the video information (Movie 2) in which a desired scene exists, and further can easily know in which portion of the video information the desired scene exists from the positional information (segment #2). Video information can be identified and further an accurate position thereof can be detected because of a data structure of the video index information.

As described above, with the video retrieval method which uses the video index information in Application 3, by using the video index information having a data structure capable of expressing a logic structure inside video information, it is possible to improve convenience in video retrieval and also to provide a video retrieval method applicable to all types of video information.

Also as described above, the video index information can be generated freely for any type of video information without being restricted by any condition, so that, by using the video index information, it is possible to improve convenience in video retrieval, and also to provide a video retrieval method applicable to any type of video information.

6) Application 4 (Video Retrieval Method which Uses the Video Index Information)

In Application 4 (Video retrieval method which uses the video index information according to the present invention), a desired video-image satisfying retrieval conditions is retrieved in one video information by referring the video index information previously prepared.

In other words, in Application 4, with a data structure of video index information 300 as described hereinafter, retrieval conditions for a desired video-image are inputted, structure element objects each including retrieval information satisfying the retrieval conditions are identified by retrieving the video index information 300, and a list of the identified structure element objects is outputted.

Figure 17:
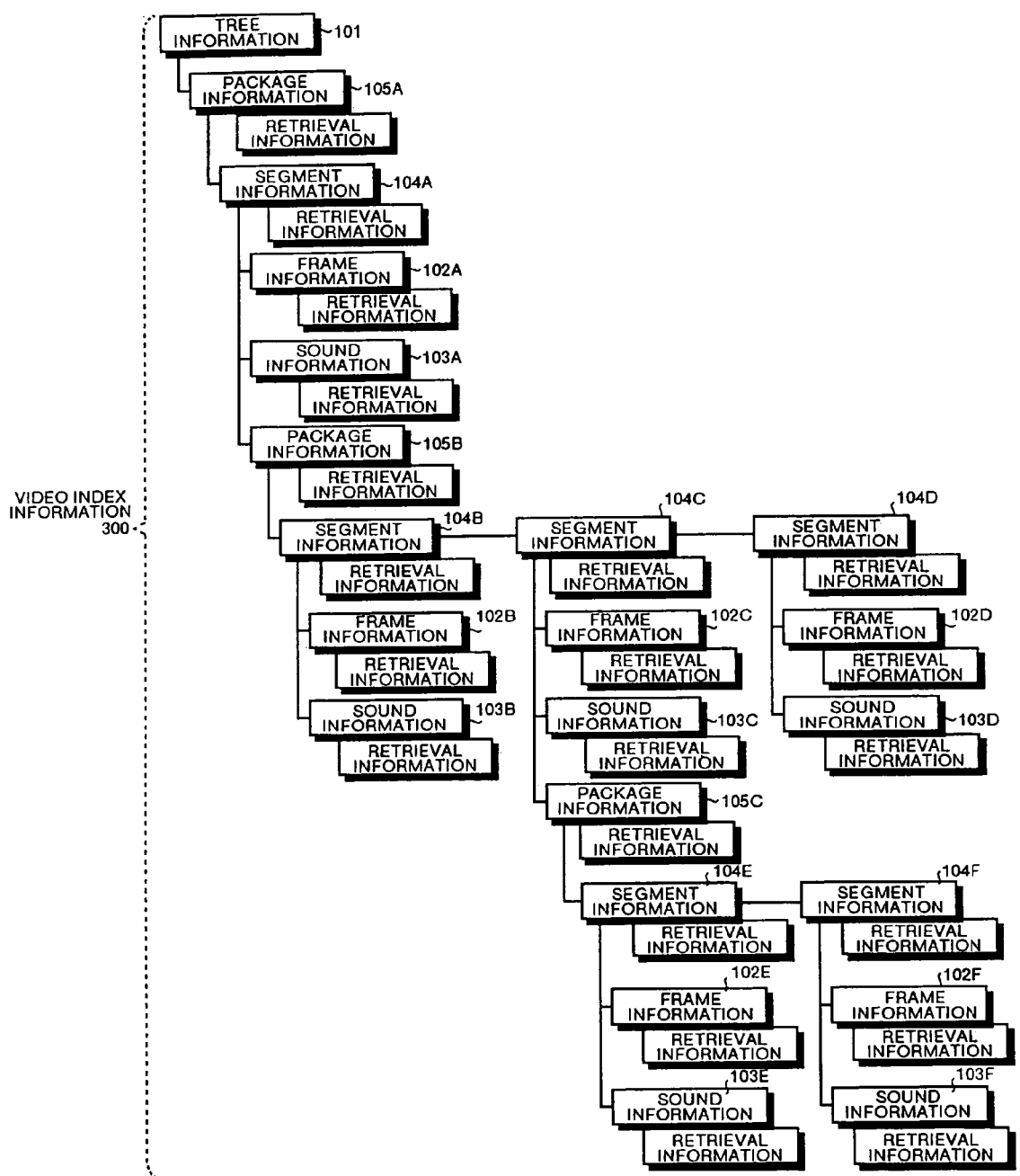
FIG. 17 is an explanatory view showing a data structure of video index information used in Application 4 of Embodiment 1.

FIG. 17 is an explanatory view showing a data structure of the video index information 300 in Application 4. It should be noted that the same reference numerals are assigned to components common to those in the video index information 100 according to Embodiment 1 shown in FIG. 1 and detailed description thereof is omitted herein.

The video index information 300 has the frame information 102, sound information 103, segment information 104, and package information 105 each as a structure element object in a tree structure with the tree information 101 at the top (entrance), and further retrieval information for retrieving contents of the frame information 102 and sound information 103 present therebelow are assigned to each structure element object. Also the tree information 101 includes a replay time or a format of video information (stream as a whole) corresponding to the video index information, and also this information is used as retrieval information.

In Application 4, a hierarchy level in a direction of depth in a tree structure of the video index information 300 is inputted as a retrieval range together with retrieval conditions, and a structure element object including retrieval information satisfying the retrieval conditions is identified by retrieving only retrieval information for structure element objects present in the retrieval range in the video index information 300, so that a list for the identified structure element objects can be outputted as a result of retrieval.

There is not any specific restriction over how to define a hierarchy level in a direction of depth in a tree structure of the video index information 300. For instance, as shown in FIG. 18, assuming that the package information 105 hierarchically present in the video index information 300 is a reference, at first a hierarchy level of the tree information 101 at the top is decided as "0", then a hierarchy level of the structure element objects (segment information 104A, frame information 102A, sound information 103A) present between the package information 105A and the next package information 105B is decided as "1", and a hierarchy level of other structure element objects is decided in the same way referring to the package information 105 as a reference. It should be noted that, if a hierarchy level "3" is specified, hierarchy levels from "0" to "2" are included.

Also as shown in FIG. 19, a hierarchy level may be decided using a structure element object as a reference.

By defining a hierarchy level as described above so that a retrieval range can be specified with a hierarchy level, for instance, when the video index information 300 to be retrieved is quite large and retrieval information has been specified in minute steps, by specifying hierarchy levels, it becomes possible to reduce a volume (range) of retrieval information to be retrieved and also to reduce a time required for retrieval. On the contrary, if it is desired to carry out more minute retrieval, by specifying a retrieval range with a deeper level of hierarchy, retrieval can be made up to a level of each discrete video-image (a portion of a scene) in video information.

Further, in a data structure of video index information 300, retrieval can be made by specifying a hierarchy level, and because of this feature, when setting retrieval information in the video index information 300, it is possible to set retrieval information concerning more general and broader matters at higher hierarchy levels and also to set more detailed retrieval information at lower hierarchy levels, so that it becomes easier to set retrieval information and also it becomes possible to set more precise retrieval information. Also even when information not relating to basic contents of video information but indicating a visual feature of a scene or a matter or the like appearing in the video information is specified as retrieval information for a structure element object (for instance, frame information 102), retrieval can be made without lowering the general efficiency and accuracy in retrieval.

Figure 20:
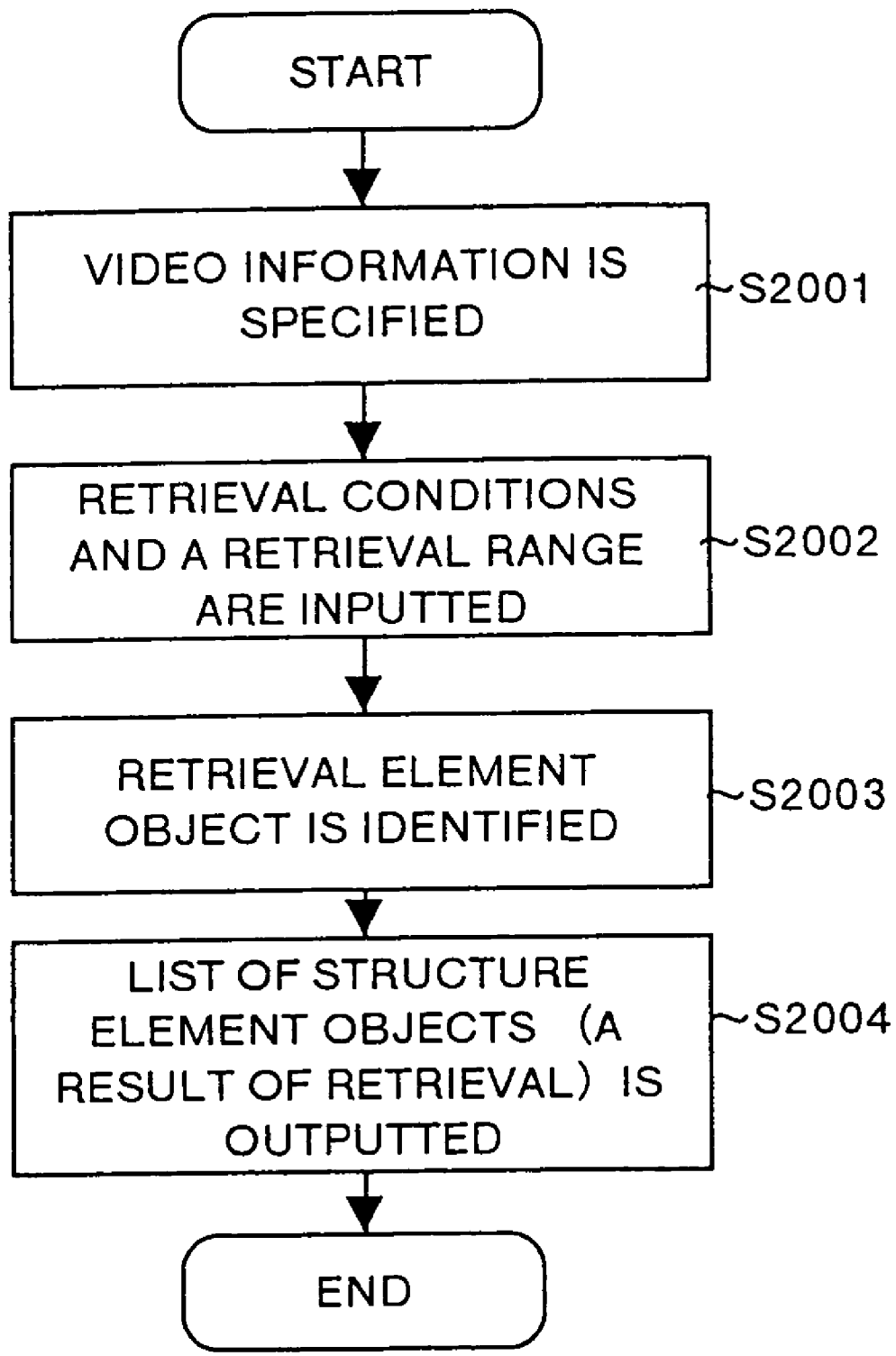
FIG. 20 is a general flow chart showing video retrieval processing in Application 4 of Embodiment 1.

FIG. 20 is a general flow chart showing video retrieval processing in Application 4. It is assumed herein that the system configuration comprises the video information library 601 with a plurality of video information stored therein as shown in FIG. 6, video index information database 602 with a plurality of video index information (herein, video index information 300) corresponding to video information stored in the video information library 601 stored therein, and a video information retrieval tool 603 which uses the video index information.

At first, video information to be retrieved is specified (step S2001), and then retrieval conditions (with each retrieval item constituting the retrieval conditions weighted according to the necessity) for a desired scene and a hierarchy level as a retrieval range are inputted (step S2002). For instance, a television program with the title of "US policy toward Japan" is specified, then. "OR retrieval according to President Clinton, car, and strong yen as keywords with " car "weighted twice" is set, and a hierarchy level "3" is specified as a retrieval range.

Then structure element objects each including retrieval information satisfying the retrieval conditions are identified by retrieving the video index information 300 corresponding to the specified video information within the specified retrieval range (step S2003). Herein it is assumed that there are four structure element objects each having retrieval information satisfying the retrieval conditions,.and that a hierarchy level for each retrieval information and the contents are as described below.

(1) "Hierarchy level 1: Speech of President Clinton"

(2) "Hierarchy level 2: Strong yen and trade frictions"

(3) "Hierarchy level 3: Damages to the car industries due to week yen, Clinton's speech"

(4) "Hierarchy level 3: Decrease of export from US car industries to Japanese market due to strong yen"

As up to hierarchy level 3 has been specified as a retrieval range, the structure element objects (1) to (4) are identified as retrieval information satisfying the retrieval conditions, but it is clear that, if up to hierarchy level 2 is specified, the structure element objects (3) and (4) are not retrieved and only the structure element objects (1) and (2) are retrieved.

Then, a list for identified structure element objects is outputted as a result of retrieval (step S2004). The structure element objects are outputted according to weights in the ranking order as shown in FIG. 21. Thus, a user can easily select the most preferable scene (desired scene) according to the ranking order. Also as structure element objects each including a desired scene are identified, it is possible to easily call out and check a desired scene in the video information from information included in the structure element objects.

As described above, with the Application 4, by using video index information having a data structure capable of expressing a logic structure inside video information, it is possible to improve convenience in video retrieval and also to provide a video retrieval method applicable to any type of video information.

Thus, with the video information retrieval method which uses the video index information according to Embodiment 1, video information is managed by using the video index information having a tree structure comprising tree information, frame information, sound information, segment information, and package information each as a structure element object, so that it is possible to provide a technique for user interface capable of expressing a logic structure inside video information and making it possible to easily use-video information, to raise a freedom in replaying video information, and also to improve adaptability of video information to operation, application, and treatment.

Further, in Embodiment 1, it is possible to provide a recording medium with the video index information having a data structure capable of expressing a logic structure inside video information recorded therein. For instance, the video index information is recorded in a computer-readable recording medium such as a hard disk, a floppy disk, a CD-ROM, an MO, a DVD, or the like, and can be used for various purposes when read out with a computer from the recording medium. Also this video index information can be distributed via the recording medium.

The video index information according to Embodiment 1 can freely be prepared without being restricted by any specific condition and regardless of a type of video information, so that, by using this video index information, it is possible to provide a video retrieval method capable of improving convenience in video retrieval and applicable to retrieval of any video information.

In the video information management system which uses the video index information according to Embodiment 2, assuming that internal information of video information is put under management, it is possible to set and manage a sequence of retrieving internal information in video information.

Also in the video information management method which uses the video index information according to Embodiment 2, like in Embodiment 1, video index information for managing the video information is generated in addition from the video information, and the video information is managed by referring the generated video index information.

Figure 22:
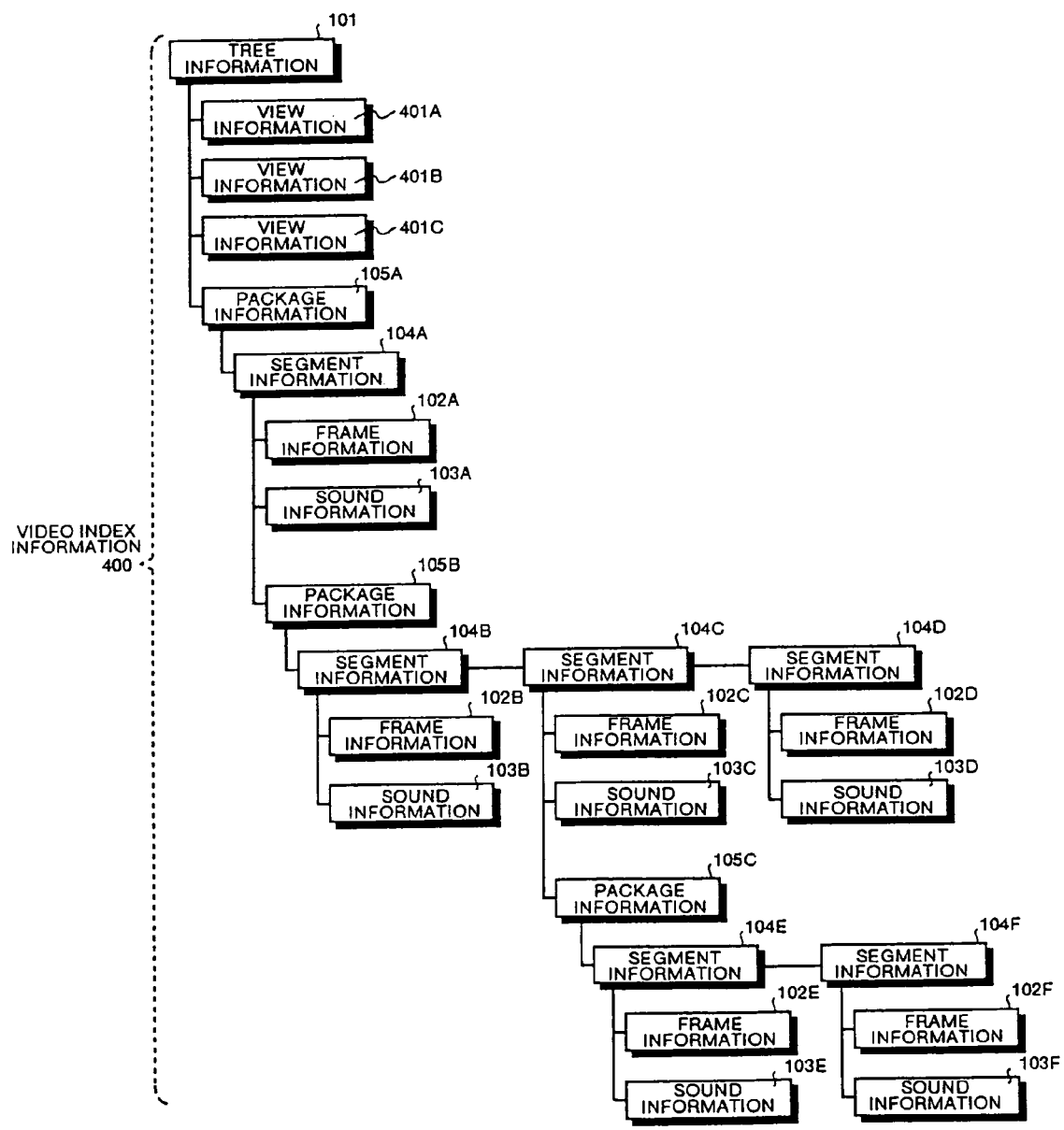
FIG. 22 is an explanatory view showing a data structure of video index information in the video information management system which uses the video index information according to Embodiment 2 of the present invention.

FIG. 22 is an explanatory view showing a data structure of video index information 400 according to Embodiment 4 of the present invention. It should be noted that the same reference numerals are assigned to the same components as those in the video index information 100 according to Embodiment 1 shown in FIG. 1 and detailed description thereof is omitted herein.

The video index information 400 has a plurality of segment information 104 for managing a desired continuous frames in the image information and view information 401 (401A to 401C) comprising a plurality of segment information 104 each for managing at least a range of a given number of successive frames in video information and a list of links between segment information indicating in what order the plurality of segment information 104 is followed. It should be noted that the video index information 400 is shown with a tree structure, but that there is no specific restriction over the structure.

A plurality of view information 401A to 401C are set, a plurality (herein, three) of link lists for following a specified number of segment information 104 according to a desired sequence are previously generated from a plurality of segment information 104 each constituting video information in correlation to the view information 401A to 401C. In Embodiment 2, video information is managed by using the video index information 400 having the plurality of view information 401A to 401C.

It should be noted that also the video index information 400 can be separated from corresponding video information like the video index information 100 according to Embodiment 1 and be maintained in the separated state.

The view information 401 expresses a sequence of following segment information 104 (or package information 105) as a link list to express one video information from one view point. It should be noted that, although the view information 401 can be expressed with any of a link list for only the segment information 104, a link list for only the package information 105, and a link list in which the two types of information above exist, but basically the link list is the same as that for the segment information 104. Although description on how to prepare view information 401 is omitted herein, the view information 401 can easily be prepared with a dedicated preparation module.

A link list for view information 401 will be explained with reference to FIG. 23. Also a digest (summary) in which the entire video information is viewed from a specific view point can be prepared with one view information 401, and simply two segment information 104 can be linked to each other.

In the figure, a link list is shown in a case where segment information for package information B obtained by dividing the entire video information according to a purpose is briefly replayed. Herein the package information B consists of three segment information, and lower package information E, F are present in the segment information at the head of the package information B.

At first, when replay is simply carried out by specifying only the package information B, segment information B1 to B3 in the package information B are, replayed as they, are. Herein, when 'segment information E1-E2-B2-B3' is prepared as a link list, the segment information is replayed in the sequence shown at (1) in the figure. Namely, in this case, portions corresponding to segment information F1 in the segment information B1 are not replayed, and the segment information B1 is roughly replayed.

As described above, by preparing a link list for the view information 401, segment information can be specified according to a desired sequence.

When a link list is prepared with the sequence of 'segment information G1-G2-G3-C3-D1', the segment information is replayed according to the sequence shown at (2) in the figure. When a link list is prepared with the sequence of 'segment information G1-G2-G3-C3-I1-I2', the segment information is replayed according to the sequence shown at (3) in the figure.

Also when a representative frame (for instance, frame information for a specified period of time at a head of each segment information) is replayed in place of the segment information itself, digest replay (replay of a summary) can be made further efficiently. More specifically, if frame information in segment information is following in place of flowing segment information itself, an effect of a link list would actually be felt more realistically. For instance, in a case shown at (1) in the figure where the package information B for a one-hour video comprises three segment information B1 to B3 each for 20 minutes, and further the segment information E prepared by dividing the segment information B1 comprises two segment information E1, E2 each for 5 minutes, and package information F comprises segment information F1 for 10 minutes, by replaying frame information for one minute from each segment information, the roughness concerning the contents is 1/5, 1/5, 1/20 and 1/20 respectively, so that an intention for preparing a digest version can be reflected.

Figure 23:
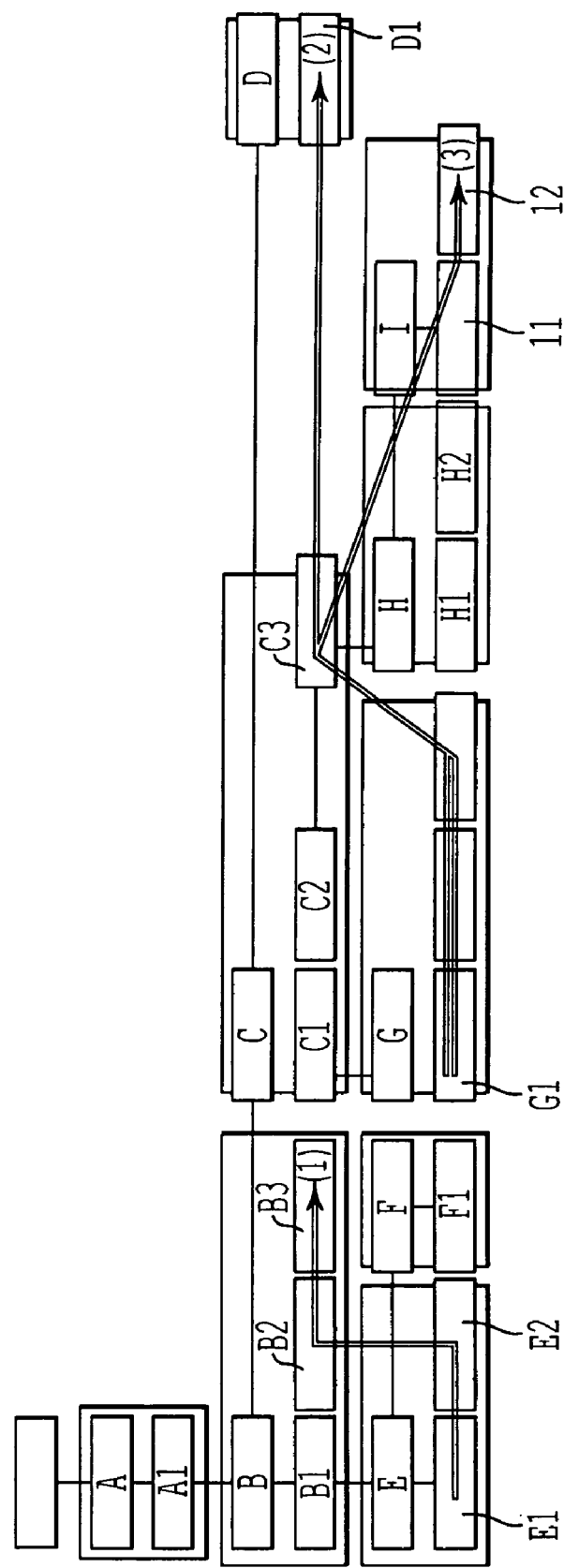
FIG. 23 is an explanatory view showing a link list for view information according to Embodiment 2.

Although only an example of a link list in which segment information is followed according to a time sequence is shown in FIG. 23, the segment information may be linked at random like 'segment information E2-C3-H2-I2-D2'. Also a link list may be prepared according to a desired sequence ignoring the time sequence.

Also by setting a plurality of view information each corresponding to a specific application like view information having a link list in which only segment information excluding violence scenes are linked to each other, or view information having a link list in which segment information for violent or active scenes are linked to each other, and by selecting desired view information according to the necessity, one video information (contents) can be viewed or used for various purposes.

Also in multi-media broadcasting or the like, the producing side can distribute video information with video index information 400 having a plurality of view information 401 attached thereto, and further a viewer can view one video information (a program) from a view point preferable to the viewer by selecting one of the link lists.

With Embodiment 2 of the present invention, as view information having a link list is used, it is possible to provide a technique for user interface enabling improvement of a freedom in replaying video information and more efficient and effective use of video information.

By specifying particular view information from a plurality of view information in the video index information 400 prepared as described above, a portion of video information can be made visible or audible by using a link list for the specified view information.

The image retrieval processing described below may be performed using the view information 401 having the image-index information 400. For instance, by specifying any of the view information 401A to 401C in the view information 400, the structure element object specified by the view information 401 is considered as a target for retrieval processing in order to retrieve the desired image scene managed by a structure element.

Incidentally, by providing the retrieval information explained above with respect to the Embodiment 1 also to each of the view information 401A to 401C, a retrieval processing that targets the view information 401 can be performed.

When the view information is set to the video index information corresponding to the video information obtained by the retrieval processing, then a view information may be specified and by using the link list of this view information a portion of video information can be made visible or audible by using a link list for the specified view information.

Thus, according to Embodiment 2, by using a view information having a link list, a video can be effectively and efficiently retrieved with the help of the video index information 400.

In an audio information management method which uses the audio index information according to Embodiment 3 of the present invention, basically a portion of the video index information 100 in the video information management method which uses the video index information according to Embodiment 1 obtained by excluding the frame information 102 therefrom is defined as audio index information. Embodiment 3 is the same as Embodiment 1 excluding the point that object information is changed from video information to audio information, so that description is made herein only for different sections.

The audio index information has a tree structure comprising sound information, segment information, and package information each as a structure element object.

Further, the sound information manages sounds corresponding to a given range in audio information as one unit of information. The segment information classifies the sound information as one unit of information as a group having desired meanings. The package information manages a plurality of segment information as a group. Further, the segment information manages package information for managing a plurality of other segment information prepared using sounds in the same range as that of the sound information managed by the segment information as a group, and in the tree structure package information is allocated in addition to sound information under one segment information to manage audio information using a tree structure of audio index information and structure element objects in the tree structure.

This audio index information can be separated from audio information itself and maintained in the separated state like in Embodiment 1.

With the configuration of audio index information as described above, it is possible to provide a technique for user interface capable of expressing a logic structure inside audio information and making it possible to easily use audio information, to improve a freedom in replaying audio information, and also to improve adaptability of audio information to operation, application, and treatment.

Next description is made for an audio retrieval method which uses the audio index information as an application of the audio information management method which uses the audio index information according to Embodiment 3. In the audio retrieval method described above, a portion of video index information 200, 300 in the video retrieval method which uses the video index information described in Application 3 or Application 4 according to Embodiment 1 with the frame information 102 removed therefrom is defined as the audio index information. Embodiment 3 is the same as that in Application 3 or Application 4 of Embodiment 1 excluding the point that the object information is changed from video information to audio information, so that description is made herein only for different sections.

The audio index information has a tree structure comprising sound information, segment information, and package information each as a structure element object.

Assumed herein is a case, for instance, where desired sounds is retrieved from audio information recording "twittering of a birds", or where audio information recording "twittering of a birds " is retrieved from a plurality of audio information. When "twittering of a kingfisher, a murmuring of a streams" is inputted as retrieval conditions and audio retrieval is carried out using audio index information, a result of retrieval (list) can be outputted like in Application 3 or Application 4 of Embodiment 1.

Namely, with the application of Embodiment 3 described above, by using audio index information having a data structure capable of expressing a logic structure inside audio information, it is possible to provide an audio retrieval method with improved convenience in audio retrieval. Thus, for instance, by using audio index information in a music CD or the like, it becomes possible to replay only a portion of a desired tune, or to make retrieval concerning contents of music such as pleasant music, comfortable music, or joyful music.

Although detailed description is omitted herein, it is desirable in Embodiments 1 to 3 described that, the image information retrieval tool 603 executes a retrieval processing by reading only the retrieval information provided to each of the structure object element of each of the image index information when reading the video index information from the video index information database 602. By doing in this way, only the information required for the retrieval processing is used and the speed of the retrieval can be increased.

In the video retrieval method which uses the video index information according to Embodiment 4 of the present invention, video information satisfying retrieval conditions is retrieved from a plurality of video information by referring to the video index information previously prepared in correlation to the video information. It should be noted that description is omitted herein for common points in the video retrieval system, configuration of video index information used for retrieval, and video retrieval processing according to Embodiment 4 to those according to Embodiment 1, and description is made only to different points.

FIG. 24 is an explanatory view showing the video retrieval method which uses the video index information according to Embodiment 4. Herein, the video index information 300A and 300B shown in FIG. 16 are direct objects for retrieval of a desired retrieval. Retrieval information 201 for retrieving contents of frames directly or indirectly managed by each structure element object is appended to the structure element object constituting the video index information 300A and 300B shown in FIG. 24. Also it is assumed herein that the frame information 102, which is one of structure element objects, manages a representative frame freely selected from successive frames in the video information managed as one unit of information, and at the same time has retrieval information 201F for retrieving contents of the representative frame. It should be noted herein that, although retrieval information of the sound information 103 is not shown in the figure, configuration is allowable in which the sound information manages a representative sound in a given range selected from sounds corresponding to a given range in the video information managed as one unit of information, and also has retrieval information for retrieving contents of the representative sound.

Next description is made for the retrieval processing according to Embodiment 4 with reference to an example of retrieval conditions as well as of a result of retrieval (list). It is assumed herein that each structure element object constituting the video index information 300A and 300B shown in FIG. 24 has retrieval information with the following contents included therein. Incidentally the video index information 300A corresponds to Movie A and the video index information 300B to Movie B.

Movie A (Video Index Information 300 B)
  Movie A is a news program, and comprises:
1) A report on Japan Olympic Committee
  (Prime minister appears.)
2) A report on an election campaign speech
  (Prime minister appears.)
3) A report on US policy toward Japan
  (President appears)

It is assumed that, corresponding to Movie A described above, a structure element object of the video index information 300A has the following retrieval information 201.
Tree information 101
  Title: News
Package information 105A
  replay time: 00:30:00
  Format: MPEG2
Segment information 104A
  Scene: Japan Olympic Committee
Segment information 104B
  Scene: Campaign speed
Segment information 104C
  Scene: US policy toward Japan
Frame information 102A
  Key frame: Image of Prime minister
Frame information 102B:
  Key frame: Image of Prime minister
Frame information 102C:
  Key frame: Image of President Movie B (Video Index Information 300B)
  Movie B is a news program having the same contents as those of Movie A, and comprises:
1) A report on Japan Olympic Committee
  (An athlete who is going to jump appears.)
2) A report on an election campaign speech
  (A reporter appears.)
3) A report on US policy toward Japan
  (Prime minister appears)
Movie B is different from Movie A in persons who appear in the reports 1) and 3).
A structure element object of the video index information 300B for Movie B described above has retrieval information 201 as described below:
Tree information 101
  Title: News
Package information 105A
  replay time: 00:30:00
  Format: MPEG2
Segment information 104A
  Scene: Japan Olympic Committee
Segment information 104B
  Scene: Campaign speed
Segment information 104C
  Scene: US policy toward Japan
Frame information 102A
Key frame: Image of an athlete who is going to jump
Frame information 102B
  Key frame: Image of a reporter
Frame information 102C
  Key frame: Image of Prime minister It should be noted that retrieval information for the video index information 200 is not always limited to the above items, and that any data format of information set as retrieval information is allowable. For instance, a key frame present as retrieval information in each frame information 102 may be, for instance, an image of the key frame, or a feature of an image extracted from an image of the key frame. It is assumed herein for convenience in description that each frame information is text information.

Next, it is assumed that a retrieval condition shown in FIG. 25 is given as a retrieval condition for retrieving a desired video-image (step S801 in FIG. 8). It should be noted that, in Embodiment 4, each retrieval item in retrieval conditions is set in correspondence to a type of each structure element object in the video index information 200. In other words, each retrieval item is set for a particular type of structure element object as an object for retrieval. In the retrieval conditions shown in FIG. 25, an object for the retrieval item "title" is package information 105 (retrieval information 201P), an object for the retrieval item "Replay time" is package information 105 (retrieval information 201P), an object for the retrieval item "Scene" is segment information 104 (retrieval information 201S), and an object for the retrieval item "Key frame" is frame information 102 (retrieval information 201F).

As described above, each retrieval item is set in correspondence to a type of each structure element object in the video index information 200 so that the retrieval item corresponds to a data format of retrieval information in each structure element object. More specifically, for instance, when an image of a key frame itself is set as retrieval information in the frame information 102, even if a key word which is text information is set as a retrieval item for retrieving a key frame, as a data format of the retrieval information is not identical to that of the retrieval item, a desired key frame can not correctly be retrieved. Therefore, when an image of a key frame itself is set as retrieval information in the frame information 102, the system side demands input of an image itself anticipated as included in a retrieved scene to be retrieved as a retrieval item in the retrieval item "key frame" shown in FIG. 25.

The correspondence between a retrieval item and a structure element object as described above is previously set in the system, and a user is required only to input a key word or the like corresponding to each retrieval item according to a method of inputting a retrieval condition instructed by the system.

Further as shown in FIG. 25, a retrieval item for a plurality of different types of structure element objects each as a retrieval object may be included in the retrieval conditions, and further a plurality of retrieval items each for the same type of structure element object as a retrieval object may be included in the retrieval conditions. In addition, it is assumed herein that, as described in Embodiment 4, a relation among retrieval items can logically be expressed by using AND and OR like in the general Boolean expression for retrieval, and also that a weight can be set for each retrieval item. Herein it is assumed that AND condition is set among retrieval items in the conditions shown in FIG. 25 and the retrieval item "Key frame" is weighted twice.

A video information retrieval tool 603 shown in FIG. 24 reads out the video index information 300A and 300B from the video index information database 602, and executes retrieval processing according to the retrieval controls shown in FIG. 25 (step S802 in FIG. 8). Herein for convenience in description, it is assumed that retrieval processing using the video index information 300A and that using video index information 300B are described in the same place.

The information retrieval tool 603 compares the retrieval item "title" in the retrieval conditions to retrieval information 201T in the tree information 101 in the video index information 300A and 300B, and when it is determined that the two information are identical to each other, processing is executed for adding points corresponding to a preset weight.

Herein, the contents "news" for, the retrieval item "title" in the conditions shown in FIG. 25 is identical to the contents "news" for the retrieval information 201T in the tree information 101 in both the video index information 300A and video index information 300B, so that, for instance, 1 point is given to both Movie A and Movie B.

Then the video information retrieval tool 603 compares the retrieval time "replay time" in conditions to the retrieval information 201P in the package information 105 in the video index information 300A and 300B, and when it is determined that the two information are identical to each other, processing is executed to add the points corresponding to a preset weight.

Herein contents "00:05:00 from up to 00:30:00" for the retrieval item "replay time" in the condition shown in FIG. 25 is coincident to the contents "00:30:00" for the retrieval item 201P of the package information 105 in the video index information 300A and 300B shown in FIG. 24, so that, for instance, 1 point is added to both the Movie A and Movie B.

The video information retrieval tool 603 compares the retrieval item "scene" in the retrieval conditions to the retrieval information 201S in the segment information 104 in the video index information 300A and 300B, and when it is determined that the two information are coincident to each other, processing for adding points according to a present weight is executed.

The contents "US policy toward Japan" of the retrieval item "scene" in the conditions shown in FIG. 25 is coincident to the contents "US policy toward Japan" of the retrieval information 201SC of the segment information 104C in the video index information 300A and 300B shown in FIG. 24, so that, for instance, 1 point is added to the Movie A and Movie B.

Further the video information retrieval tool 603 compares the retrieval "key frame" in the conditions to the retrieval information 201F for the frame information 102 in the video index information 300A and 300B, and when it is determined that the two information are coincident to each other, the video information retrieval tool 603 executes processing for adding points according to a preset weight.

The contents "Image of Prime minister" of the retrieval item "scene" in the condition shown in FIG. 25 are coincident to the contents "Image of Prime minister of the retrieval image 201FA of the frame information 102A in the video index information 300A shown in FIG. 24 as well as to the contents of "Image of prime minister" of the retrieval information of the frame information 102A, and also the retrieval item "key frame" is weighted twice, so that, for instance, 4 point is given to the Movie A. On the other hand, the contents "Image of Prime minister" of the retrieval item "scene" in the condition shown in FIG. 25 is coincident to the contents "Image of Prime Minister" of the retrieval information 201FC in of the frame information 102C in the video index information 300B shown in FIG. 24, so that, for instance, 2 points are added to the Movie B.

Then the video information retrieval tool 603 makes determination as to whether all of retrieval items are coincident to retrieval information for structure element objects in the video index information 200 or not because AND condition has been set among the retrieval items, and when coincident is determined, the video information retrieval tool 603 determines that the video-image (scene) is "acceptable", and when it is determined that there is no coincidence, the video information retrieval tool 603 determined that the video-image is "not acceptable". It should be noted that, when OR condition has been set among the retrieval items, determination is made as to whether any one of the retrieval items is coincident to retrieval information for any of structure element objects in the video index information 200, and when it is determined that there is coincidence, the video-image is recognized as "acceptable", and otherwise as "not acceptable". When both AND condition and OR condition have been set as a relation among the retrieval items, determination is made whether each condition is satisfied or not.

As each of the retrieval items shown in FIG. 25 is coincident to any of retrieval information 201 in the structure element objects in the video index information 300A and 300B, so that both the Movie A and Movie B are determined as "acceptable".

FIG. 26 is an explanatory view showing a result of retrieval when retrieval is executed to the Movie A and Movie B using the conditions shown in FIG. 25. As shown in FIG. 26, a result of retrieval indicates that both the Movie A and Movie B are coincident to the condition shown in FIG. 25. Also that the Movie A and Movie B are ranked as in FIG. 26 according to the points provided thereto respectively.

As described above, with the video retrieval method which uses the video index information according to Embodiment 4, by setting retrieval items each constituting retrieval conditions according to a type of structure element objects, the necessity of determination as to whether each retrieval item is coincident to all retrieval information for a structure element object is eliminated, so that retrieval processing can be executed at high speed. Also retrieval conditions are inputted so that a data format and a data format of retrieval information in a structure element object as a object for retrieval are identical to each other, so that, even when retrieval information with a data format different for each type of structure element object is added, correct retrieval processing can be executed. As a result, as retrieval information with a data format different and adapted to each type of structure element object can be set, for instance, not only text information, but also retrieval information with a data format suited to a type of structure element object such as an image itself or the like can be added, so that video retrieval processing can be executed from various points of view.

Figure 27:
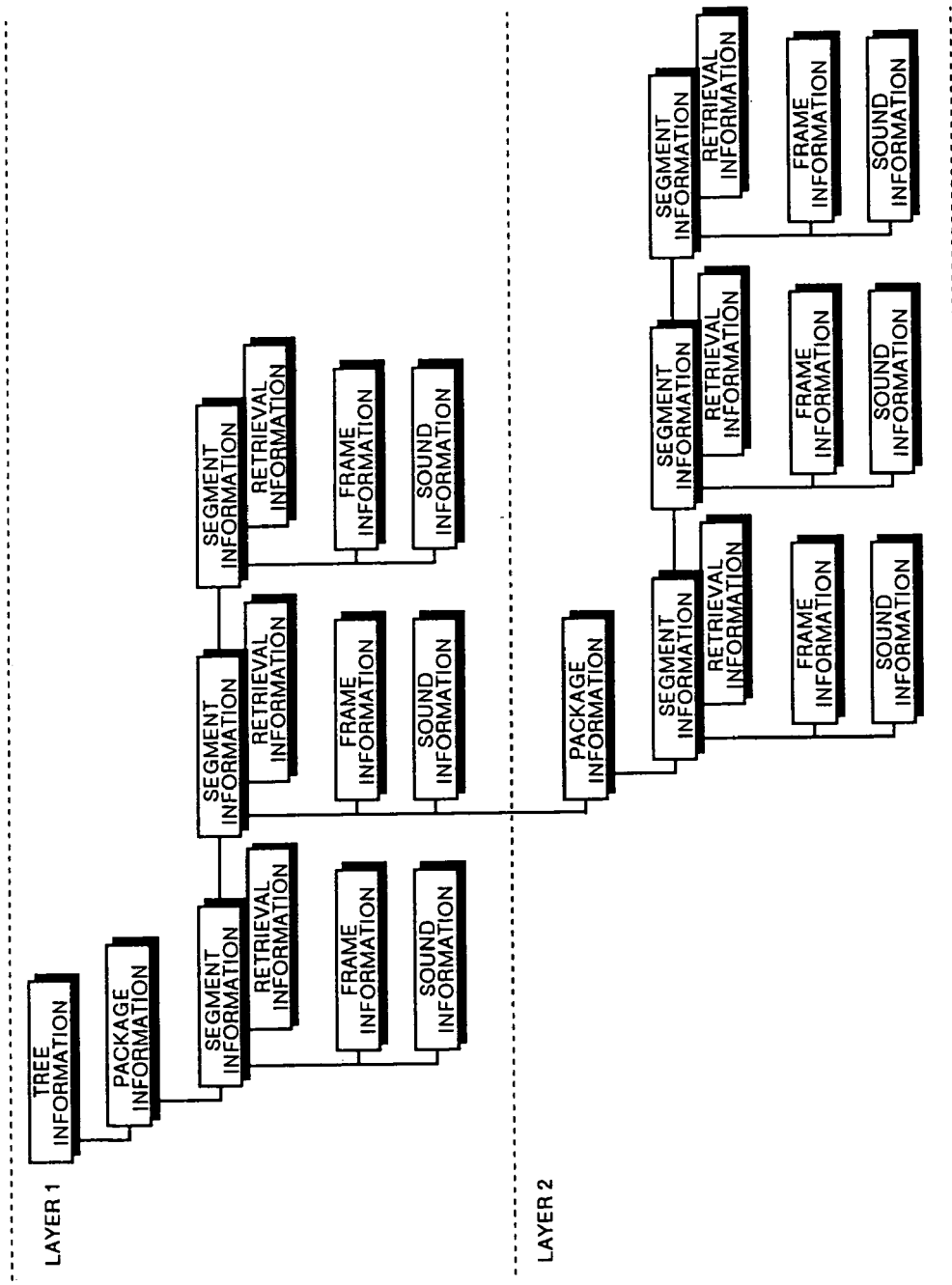
FIG. 27 is an explanatory view showing a method of setting a range for retrieval of video index information in Embodiment 4 of the present invention.

It should be noted that the video index information 200 has a format in which contents of video-image are described more detailedly at lower hierarchy levels. Therefore, for instance, as shown in FIG. 27, of a plurality if video index information 200, at first rough retrieval is carried out for up to a hierarchy level of layer 1 is executed putting a weight not on precision of retrieval but on a retrieval speed, and then retrieval processing up to a hierarchy level of up to layer 2 is executed to raise precision of retrieval. This method can be adapted to the video retrieval processing according to Embodiments 4 and 2 of the present invention, and a retrieval range is inputted together with retrieval conditions in step S801 in FIG. 8. Detailed description for the method of retrieval by specifying a retrieval range is made in Embodiment 7.

A video retrieval method which uses the video index information according to Embodiment 5 is characterized in that a result of retrieval is optimized in the video retrieval method described in Embodiment 4.

Examination of the condition (FIG. 25) and a result of retrieval (FIG. 26) described in Embodiment 4 clarifies the following problems. Namely, when the conditions shown in FIG. 25 means that "One video stream including a report concerning US policy toward Japan and a report in which Prime minister appears is to be retrieved, it is determined that a result of retrieval shown in FIG. 26. is correct. For, both the Movie A and Movie B described in Embodiment 4 include a report concerning US policy toward Japan and a report in which Prime minister appears.

On the other hand, when the condition shown in FIG. 25 means that Prime minister speaking on US policy toward Japan is to be retrieved, namely that "One video scene including a report concerning US policy toward Japan in which Prime minister appears is to be retrieved", it is determined that a result of retrieval including Movie A shown in FIG. 26 is not correct. This is because, in the news concerning US policy toward Japan in Movie A used in Embodiment 4, Prime minister does not appear.

In the video retrieval method which uses the video index information according to Embodiment 5, retrieval processing is executed by checking coincidence between retrieval conditions and an entire video stream, but also even coincidence between retrieval conditions and a specified scene in the entire video stream. The video retrieval method which uses the video index information according to Embodiment 5 under condition shown in FIG. 25 is explained below.

In Embodiment 5, whether retrieval should be made for an entire video stream as an object for retrieval or for a specific scene in the video stream is specified when retrieval conditions are inputted in step S801 shown in FIG. 8. Namely, even when the retrieval item "scene" and retrieval item "key frame" in the conditions shown in FIG. 25 are linked to each other under AND condition, if there is a structure element object having retrieval information satisfying these retrieval items is present in the video index information 200, it is determined that the retrieval condition is coincident to the video-image (scene). However, if setting for determining even coincidence of a scene described later is previously made in the video information retrieval tool 603, the operation for setting as described above is not required.

Then it is assumed in the following description that the same retrieval processing as that in Embodiment 4 is executed bases on the condition shown in FIG. 25 and the following results are obtained for Movie A and Movie B.

Movie A
  Coincidence between the retrieval item 'title' and retrieval information 201T in tree information 101
  Coincidence between the retrieval item "replay time" and retrieval information 201P in package information 105
  Coincidence between the retrieval item "scene" and retrieval information 201S in segment 104C
  Coincidence between the retrieval item "key frame" and retrieval information 201FB in retrieval information 201A as well as of frame information 102B in frame information 102A Movie B
  Coincidence between the retrieval item "title" and retrieval information 201T in tree information 101
  Coincidence between the retrieval item "replay time" and retrieval information 201P in package information 105
  Coincidence between the retrieval item "scene" and retrieval information 201SC in segment information 104C
  Coincidence between the retrieval item "key frame" and retrieval information 201FC in frame information 102C Then the video information retrieval tool 603 determines, by referring to the result described above and centering on segment information, whether structure element objects satisfying each retrieval item relate to the same scene or not. Herein it is assumed as an example that determination is made as to whether segment information satisfying the retrieval item "scene" shown in FIG. 25 and frame information 102 coincident to the retrieval item "key frame" relate to the same scene or not.

In Movie A, contents of retrieval information 201SC in segment information 104 which the retrieval item "scene" is coincident to is "US policy toward Japan", and contents of retrieval information 201A of frame information 102A as well as retrieval information 201Fb of frame information 102B, to which the retrieval item "key" frames is coincident, is "Image of Prime ministers. However, the frame information 102A and 102B correspond to the segment information 104A and 104B having the contents of "Japan Olympic Committee" and "Campaign speed for a candidate in election" respectively, and therefore it is determined that Movie A does not include the "scene relating to US policy toward Japan in which Prime minister appears". Accordingly, this case is different from that in Embodiment 4, and it is determined that Movie A is "unacceptable" under the condition shown in FIG. 25, and that the condition in FIG. 25 is not coincident to Movie A.

On the other hand, in Movie B, contents of retrieval information 201SC of segment information 104C to which the retrieval item "scene" is coincident is "US policy toward Japan", and contents of retrieval information 201C of the frame information 102C to which the retrieval item "key frame" is coincident is "Image of Prime minister". Namely the frame information 102C which is coincident to the retrieval item "key frame" in the conditions shown in FIG. 25 is put under management by the segment information 104C which is coincident to the same retrieval item "scene", and it is determined that the Movie B includes the "scene relating to US policy toward Japan in which Prime minister appears". Accordingly, it is determined that Movie B is "acceptable" under the condition shown in FIG. 25 and that the condition shown in FIG. 25 is coincident to Movie B.

It should be noted that the video information retrieval tool 603 may give points previously set according to a number of coincident scenes (herein, 3 points) to Movie B (these points are also used for the ranking described in Embodiment 4).

FIG. 28 is an explanatory view showing a result of retrieval for Movie A and movie B according to the method described above. In Embodiment 5, it is determined that Movie A does not include "a scene concerning US policy toward Japan in which Prime minister appears", and different from a result of retrieval in Embodiment 4 shown in FIG. 26, only Movie B is shown as a result of retrieval in FIG. 28.

As described above, with the video retrieval method which uses the video index information according to Embodiment 5 of the present invention, a result of retrieval can further be optimized by determining not only coincidence between retrieval conditions and an entire video stream, but also coincidence between retrieval conditions and a scene b the entire vide stream.

Although detailed description is not provided herein, also when there are a plurality of retrieval items for segment information 104 as an object for retrieval, coincidence between the retrieval conditions and a scene in a video stream can be determined by making determination as to whether the segment information 104 having the retrieval information 201. corresponding to each of the retrieval items is identical or not. Further, a relation between the segment information 104 and sound information 103 can be determined in the same way as the relation between the segment information 104 and frame information 103 described above.

In the video retrieval system according to Embodiment 6, a retrieval information delivery file is prepared by using video index information having a data structure as described in Embodiments 1 to 5 and extracting retrieval information from the video index information, and retrieval of even internal information of video information can easily be carried out by executing video retrieval with this retrieval information delivery file. In other words, there is provided a video retrieval system in which retrieval of even internal Information of the video information can easily be executed by using the video index information having a data structure capable of expressing a logic structure inside video information.

Figure 29:
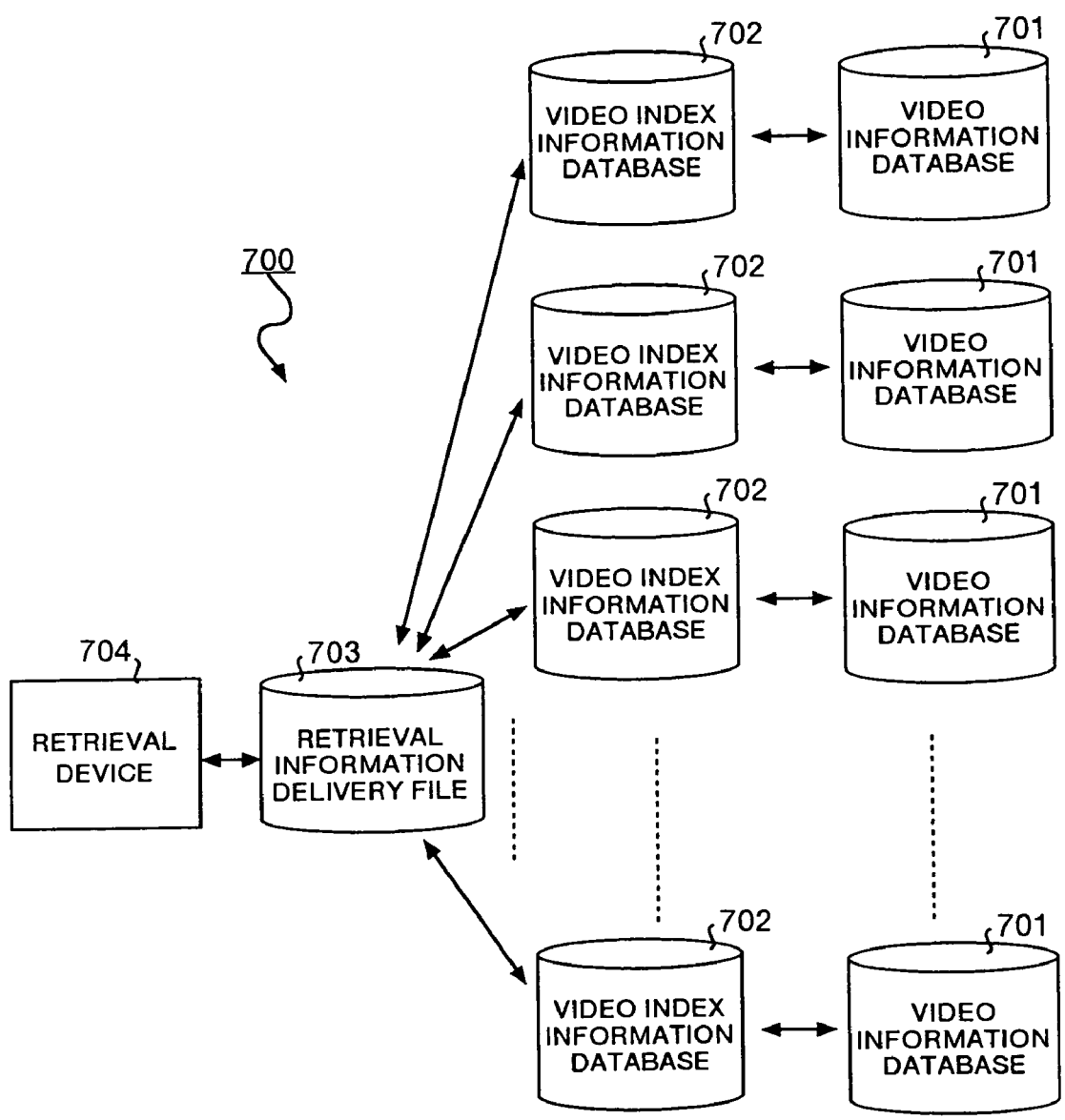
FIG. 29 is a general system block diagram showing a video retrieval system according to Embodiment 6.

FIG. 29 shows general configuration of the video retrieval system according to Embodiment 6 of the present invention, and a video retrieval system 700 comprises a plurality of video information databases 701 each with a plurality of video information stored therein, a plurality of video index information databases 702 each with a video index information previously prepared in correlation to each video information stored therein, a retrieval information delivery file 703 generated by extracting retrieval information for retrieving video information stored in the video index information, and a retrieval device 704 for retrieving video information coincident to or similar to a desired retrieval condition from the video information database 701 using the video information delivery file 703.

The video index information stored in the video index information database 702 has a tree structure comprising at least one frame information for managing a given number of successive frames in video information as one unit of information, at least one sound information for managing sounds corresponding to a given range in video information as one unit of information, at least one segment information for classifying frame information and sound information each as one unit of information and managing the information as a group having desired meanings, and package information for managing a plurality of segment information as a group each as a structure element object, and of the structure element objects, at least one type of structure element objects have retrieval information for retrieving contents of a frame and/or sounds directly or indirectly managed by the structure element object, the segment information manages packages for managing other segment information prepared by using a frame and sounds in the same range as that of frame information and sound information managed by the segment information as a group, and further in the tree structure, package information is allocated in addition to the frame information and sound information under one segment information.

Herein it is assumed as an example that, like a data structure of the video index information 300 shown in FIG. 17, retrieval information is appended to all structure element objects.

The retrieval information delivery file 703 correlates retrieval information extracted from a plurality of video index information databases 702 to a structure element object from which each retrieval information is extracted as well as to video index information in which the structure element object is present, and classifies the retrieval information into a plurality of categories and stores the retrieval information in the classified information.

It is needless to say that retrieval information appended to one structure element object itself may consist of a plurality of retrieval information, and for instance, when retrieval information has the contents of "Person appearing: Taro Tanaka; features of the person: high nose, double eyelid, and mustache; location: French restaurant in Ginza; time zone: midnights, it is understood that four retrieval information, namely "Person appearing: Taro Tanaka", "features of the person: high nose, double eyelid, and mustache", "location: French restaurant in Ginza", and "time zone: midnight " are included.

The retrieval information can be classified to four categories such as "Person appearing", "features of the person", "location", and "time zone".

Accordingly, description is made for a data structure of the retrieval information delivery file 703 taking up the classification category "Person appearing" as an example.

Data 1:

Taro Tanaka/information identifying a structure element object as a source of extraction"/information identifying video index information to which the structure element object as a source for extraction belongs Data 2:

Koichi Yamada/information identifying a structure element object as a source of extraction"/information identifying video index information to which the structure element object as a source for extraction belongs Data 3:

Hanako Nihon/information identifying a structure element object as a source of extraction"/information identifying video index information to which the structure element object as a source for extraction belongs A person can be retrieved according to the classification category "Person appearing", and also it is possible to identify in which structure element object the retrieved character is included.

When the classification category "features of the person" is used, the data structure is as described below:

Data 1:

High nose, double eyelid, mustache/information identifying a structure element object as a source of extractions"/information identifying video index information to which the structure element object as a source for extraction belongs Data 2:

Spectacles, oblique tooth, blue eye/information identifying a structure element object as a source of extraction"/information identifying video index information to which the structure element object as a source for extraction belongs Data 3:

Low nose, thin eyebrows, large eyes, injury in cheek/information identifying a structure element object as a source of extraction"/information identifying video index information to which the structure element object as a source for extraction belongs Because of the data structure as described above, features of a face of a person can be retrieved according to the classification category "features of a case of a person", and further it is possible to identify in which structure element object the person having the retrieved face feature is included of video index information. Further, data for each classification category has information identifying a structure element object and information identifying video index information as common data. In other words, contents of each classification category are linked to each other through the common data, and it is possible to retrieve features of a face of a character by inputting "a person having features of a face such as XYZ" for retrieval according to the classification category "features of a person's face" and classification category "Person appearing", to identify a structure element object in corresponding video index information from features of the retrieved character's face, and also to identify a character from the structure element object in the corresponding video index information. Also it is needless to say that the corresponding video information can be retrieved from the video index information and structure element object corresponding to the character.

The data structure of the retrieval information delivery file 703 described above is an example employed for simplifying the description, and in reality there is no specific restriction over a data structure in the retrieval information delivery file 703 so long as the corresponding video index information and structure element object can be identified from the classified retrieval information. More specifically, when a delivery file having information for identifying video index information and structure element objects as first and second items (essential items) and also all classification categories present in the retrieval information delivery file 703 as a record item is prepared and retrieval conditions are inputted, the first and second items of a record most completely satisfying the inputted retrieval conditions (namely a record with a highest coincidence degree or a similarity degree) may be outputted as a result of retrieval. It is needless to say that a database having the same functions as the delivery file is within a range of the delivery file according to the present invention.

Further a personal computer or the like can be used as the retrieval device 704. Namely any configuration is allowable on the condition that there are provided an input unit for inputting retrieval conditions, a program execution unit for executing a program for video retrieval processing, and a display unit for displaying various type of video and information. When retrieval conditions indicating a desired video-image (scene) are inputted, the retrieval device 704 identifies retrieval information coincident to or similar to the retrieval conditions using various types of retrieval information in the retrieval information delivery file 703 and other information relating to the former information, and outputs the required video information as a result of retrieval according to video index information including the corresponding video information.

In FIG. 29, configuration is allowable in which the retrieval device 704 can discretely access each of the video information database 701, video index information database 702, and retrieval information delivery file 703 through a processing device such as a server not shown herein, or in which each of the components described above is connected to the retrieval device 704 respectively. What is important herein is the fact that video index information corresponding to video information stored in each video index information database 701 is stored in any of the video index information databases 702, that the retrieval information delivery file 703 with retrieval information extracted from video index information stored in all of the video index information databases 702 stored therein as a delivery file is present, and that contents of all the video information databases 701 (video information stored therein) can indirectly be retrieved by retrieving only the retrieval information delivery file with the retrieval device 704.

With the configuration as described above, in the video retrieval system according to Embodiment 6 of the present invention, at first video information is stored in the video information database 701, then video index information corresponding to the video information is prepared and stored in the video index information database 702, retrieval information is extracted from the video index information and classified into a plurality of categories, which are additionally registered in the retrieval information delivery file 703.

For retrieving the desired video information, when retrieval conditions are inputted into the retrieval device 704, the retrieval device 704 identifies a structure element object coincident to or similar to the inputted retrieval condition (and video index information in which the corresponding structure element object is present) by referring to the retrieval information delivery file 703, and outputs the structure element object as a result of retrieval.

As retrieval information in the retrieval information delivery file 703 is generated by making use of video index information having a data structure capable of expressing a logic structure inside the video information, even internal information of video information can be retrieved. Also retrieval information based on video index information for all video information are stored in one retrieval information delivery file 703, so that even internal information of video information can easily be retrieved only by accessing the retrieval information delivery file 703 with the retrieval device 704.

A video retrieval system according to Embodiment 7 of the present invention is basically identical to that according to Embodiment 6, so that detailed description is made herein only for different sections.

Figure 30:
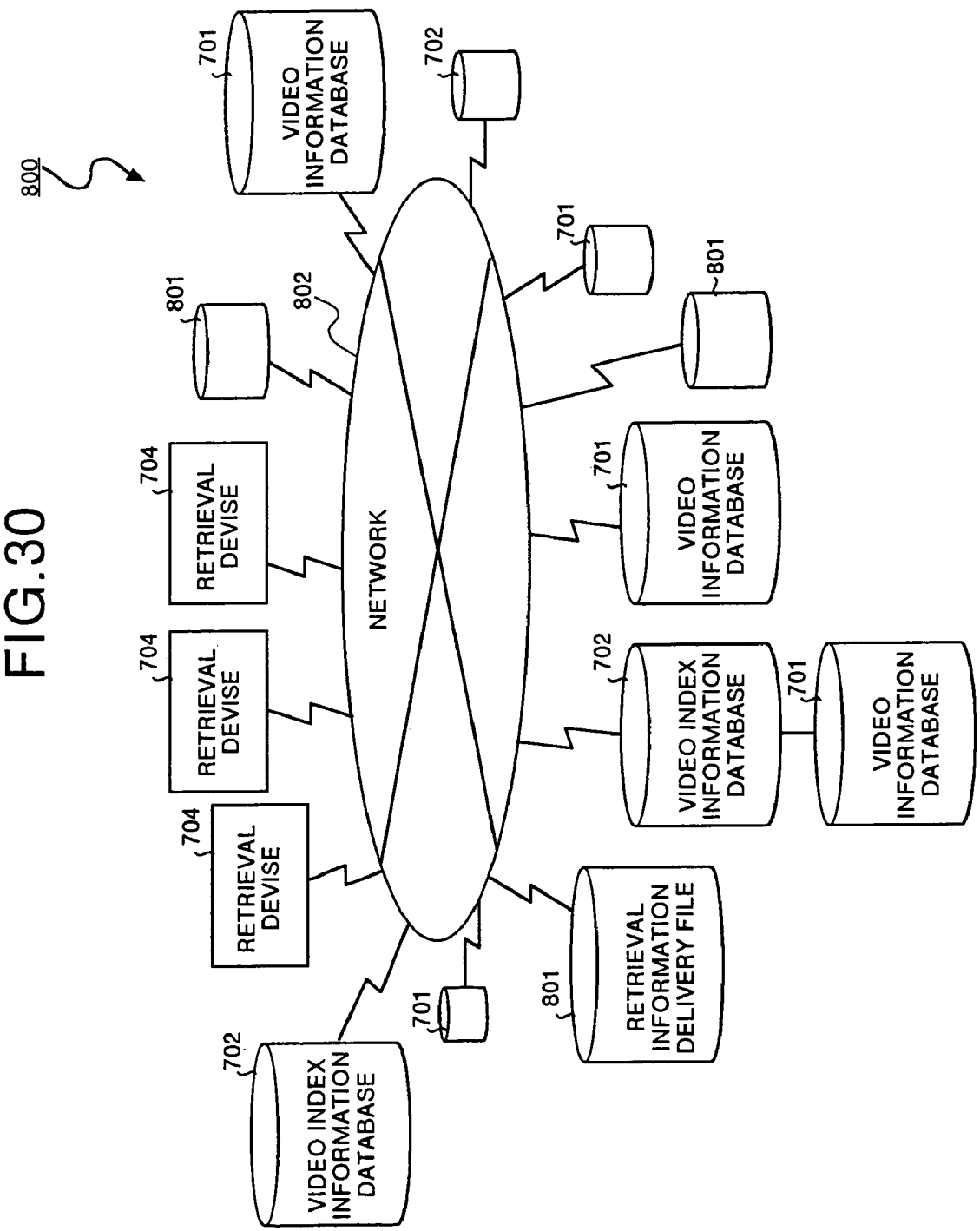
FIG. 30 is a general system block diagram showing a video retrieval system according to Embodiment 7.

FIG. 30 shows general system configuration of the video retrieval system according to Embodiment 7, and a video retrieval system 800 comprises a plurality of video information databases 701 each with a plurality of video information stored therein, a plurality of video index information databases 702 each with video index information previously prepared in correlation to each video information, a plurality of retrieval information delivery files 801 each storing therein a plurality of retrieval information for retrieving video information stores in the video information databases 701 from video index information stored in the plurality of video index information databases 702; and a plurality of retrieval devices 704 for retrieving video information coincident or similar to desired retrieval conditions from the video information database 701 with the retrieval information delivery file 801.

The video information databases 701, video index information databases 702, retrieval information delivery files 801, and retrieval devices 704 are provided on a network, and any of he retrieval devices 704 on the network 802 can be connected to all of the video index information databases 702 and video information databases 701 on the network via any of the retrieval information delivery files on the network 802. In other words, same contents is stored in each of the plurality of retrieval information delivery files 801, and is prepared, for instance, by copying the retrieval information delivery file 801 equivalent to a master file. As the network 802, the Internet, the Intranet, a local area network, or the like can be considered.

Video index information according to Embodiment 7 has the same data structure as that in Embodiment 6, but it is assumed herein that video information is not directly appended to a structure element object in the video index information.

Accordingly also it is assumed herein that, when video index information is generated from video information and is stored in the video index information database 702, video information correlated to each structure element object in the video index information is independently prepared, the prepared plurality of retrieval information are classified to a plurality of categories, and the retrieval information is stored in the retrieval information delivery file 801 in correlation to structure element-objects retrieved according to each retrieval information and video index information in which the structure element object is present.

With the configuration as described above, the video retrieval system 800 according to Embodiment 7 provides the same advantages as those in Embodiment 6, and further can provide improved convenience for users in video retrieval because the component devices are connected to each other through the network 802. Especially, when an URL/URI is provided in each component device (video information database 701, video index information 702, retrieval information delivery file 801, and retrieval device 704) and the component devices are connected to each other through the network 802, many users can use the video retrieval system 800 through the Internet or the like, so that availability of the system for users is substantially enhanced.

Further as a variant of Embodiment 7 of the present invention, the configuration is allowable in which contents stored in each retrieval information delivery file is differentiated, one retrieval information delivery file 801 can access only a plurality of prespecified video index information databases 702 and prespecified video information databases 702, and a user retrieves video information managed in the video index information databases 702 and video information databases 701 accessible from the retrieval information delivery file 801 by selecting a retrieval information delivery file from a plurality of retrieval information delivery file 801.

With the configuration as described above, retrieval information delivery files on the network 802 can be managed discretely, so that system maintenance is easy and scaling-up of the system can be made easily.

As described above, with the recording medium which uses the video index information recorded therein according to the present invention, it is possible to provide a recording medium with video index information having a data structure capable of expressing a logic structure inside video information and enabling improvement of convenience in video retrieval.

Further, the video information management method which uses the video index information according to the present invention is a video information management method which uses the video index information for managing video information by analyzing video information including at least a plurality of frames, generating apart from the video information video index information for managing the video information, and referring to the generated video index information, in which the video index information has a tree structure comprising at least one frame information for managing a given number of successive frames in video information as one unit of information, at least one sound information for managing sounds corresponding to a given range in the video information as one unit of information, at least one segment information for classifying frame information and sound information each as one unit of information and managing the information as a group having desired meanings, and package information for a plurality of segment information as a group each as a structure element object, and further in the tree structure, the segment information manages package information for managing other segment information prepared by using frames and sounds in the same range as that of the frame information and sound information managed by the segment information as a group, and package information is allocated in addition to frame information and sound information under one segment information and video information is managed by using a tree structure of video index information and structure element objects therein. Therefore, it is possible to provide a technique for user interface making it possible to easily use video information, raise a freedom in replaying video information, and improve adaptability of video information to operation, application, and treatment. In addition, retrieval and classification reflecting even contents of video information can be carried out.

Further, the video information management method which uses the video index information according to the present invention is a video information management method which uses the video index information for managing video information by analyzing video information including at least a plurality of frames, generating apart from the video information video index information for managing the video information, and referring to the generated video index information, in which the video index information has view information consisting of at least one segment information for managing a range of a given number of successive frames in video information and a link list for segment information indicating in what order the plurality of segment information are to be followed, a plurality of link list each for indicating a desired order for following a required number of segment information are generated, a plurality of view information each corresponding to each link list are set, and video information is managed by using the video index information having a plurality of view information. Therefore, it is possible to provide a technique for user interface making it possible to raise a freedom in video info and to efficiently and effectively use video information.

Further, with the recording medium with audio index information recorded therein according to the present invention, it is possible to provide a recording medium with the audio index information having a data structure capable of expressing a logic structure inside audio information and enabling improvement of convenience in audio retrieval.

Further, the audio information management method which uses the audio index information according to the present invention is an audio information management method which uses the audio index information for managing audio information by analyzing audio information including at least a plurality of frames, generating apart from the audio information audio index information for managing the audio information, and referring to the generated audio index information, in which the audio index information has a tree structure comprising at least one frame information for managing a given number of successive frames in audio information as one unit of information, at least one sound information for managing sounds corresponding to a given range in the audio information as one unit of information, at least one segment information for classifying frame information and sound information each as one unit of information and managing the information as a group having desired meanings, and package information for a plurality of segment information as a group each as a structure element object, and further in the tree structure, the segment information manages package information for managing other segment information prepared by using frames and sounds in the same range as that of the frame information and sound information managed by the segment information as a group, and package information is allocated in addition to frame information and sound information under one segment information and video information is managed by using a tree structure of video index information and structure element objects therein. Therefore, it is possible to provide a technique for user interface making it possible to easily use audio information, raise a freedom in replaying audio information, and improve adaptability of video information to operation, application, and treatment. In addition, retrieval and classification reflecting even contents of audio information can be carried out.

Further, in the video retrieval method using video index information according to the present invention, of the structure element objects, at least one type of structure element objects have retrieval information for retrieving contents of frames and/or sounds directly and indirectly managed by the structure element objects, further the segment information manages package information for managing other segment information prepared by using frames and sounds in the same range as that of the frame information and sound information managed by the segment information, and in the tree structure package information is allocated in addition to frame information and sound information under one segment information, retrieval conditions for a desired video-image (scene) are inputted to identify video index information including retrieval information satisfying the inputted retrieval conditions by retrieving a plurality of video index information previously prepared from a plurality of different video information, and a list for video information corresponding to the identified video index information is outputted as a result of retrieval. Therefore, it is possible to provide a video retrieval method enabling improvement of convenience in video retrieval using video index information having a data structure capable of expressing a logic structure inside the video information and applicable to all video information. Further, a position of a structure element object having retrieval information satisfying the retrieval conditions is outputted on a list, so that a position of a desired scene in video information can easily be identified. Further, a weight can be provided to each important retrieval item, so that a scene desired by a user can easily be retrieved. Further, video information is outputted in the order of ranks, so that a scene most similar to the desired by a user desire can be determined from the rank.

Further, in the video retrieval method which uses the video index information according to the present invention, a structure element object has retrieval information for retrieving information for retrieving contents of frames and/or sounds directly or indirectly managed by the structure element object, and segment information manages package information for managing other segment information prepared by using frames and sounds in the same range as that of the frame information and sound information managed by the segment information, and in the tree structure, package information is allocated in addition to frame information and sound information under one segment information, retrieval conditions for a desired scene are inputted, a structure element object including retrieval information satisfying the retrieval conditions is identified by retrieving video index information, and a list for identified structure element objects is outputted as a result of retrieval. Therefore, it is possible to provide a video retrieval method enabling improvement of convenience in video retrieval by using video index information having a data structure capable of expressing a logic structure inside the video information and applicable to all types of video information. Further, a position of a structure element object having retrieval information satisfying the inputted retrieval conditions, so that a position of a desired scene can easily be identified. Further, a hierarchy level in the tree structure can be specified as a range for retrieval, so that a volume (range) of retrieval information to be retrieved can be reduced and a time required for retrieval can be shortened. On the contrary, when more detailed retrieval is required, each discrete scene in video information can even be retrieved by specifying a retrieval range down to a deeper hierarchy level. Further, a weight can be given to each important retrieval item, so that a user can easily retrieve a desired scene. Further, video information is outputted according to the order of ranks, so that a user can determine a scene most similar to one desired by the user.

Further, in the audio retrieval method which uses the audio index information according to the present invention, of the structure element objects, at least one type of structure element objects have retrieval information for retrieving contents of frames and/or sounds directly and indirectly managed by the structure element objects, further the segment information manages package information for managing other segment information prepared by using frames and sounds in the same range as that of the frame information and sound information managed by the segment information, and in the tree structure package information is allocated in addition to frame information and sound information under one segment information, retrieval conditions for desired sounds are inputted to identify audio index information including retrieval information satisfying the inputted retrieval conditions by retrieving a plurality of audio index information previously prepared from a plurality of different audio information, and a list for audio information corresponding to the identified audio index information is outputted as a result of retrieval. Therefore, it is possible to provide an audio retrieval method enabling improvement of convenience in audio retrieval using audio index information having a data structure capable of expressing a logic structure inside the audio information and applicable to all audio information.

Further, in the audio retrieval method which uses the audio index information according to the present invention, a structure element object has retrieval information for retrieving information for retrieving contents of sounds directly or indirectly managed by the structure element object, and segment information manages package information for managing other segment information prepared by using sounds in the same range as that of sound information managed by the segment information, and in the tree structure, package information is allocated in addition to sound information under one segment information, retrieval conditions for a desired scene are inputted and structure element object including retrieval information satisfying the retrieval conditions is identified by retrieving audio index information, and a list for identified structure element objects is outputted as a result of retrieval. Therefore, it is possible to provide an audio retrieval method enabling improvement of convenience in audio retrieval by using audio index information having a data structure capable of expressing a logic structure inside the audio information and applicable to all types of video information. Further, video information is outputted according to the order of rank, so that a user can determine a scene most similar to one desired by the user.

Further, the video retrieval system according to the present invention is a video retrieval system comprising a plurality of video information databases, a plurality of video index information databases, a retrieval information delivery file, and a retrieval device, and when retrieval conditions for a desired scene are inputted, the retrieval device identifies retrieval information coincident or similar to the retrieval conditions, and outputs the required video information according to video index information including the retrieval information as a result of retrieval. Therefore, it is possible to provided a video retrieval system in which retrieval reflecting even internal information of video information can easily be executed by using video index information having a data structure capable of expressing a logic structure inside the video information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium storing a computer program with video index information generated based on video information recorded therein, the video index information having a tree structure, the computer program including instructions configured to cause a computer to execute a method comprising:
    managing a predetermined segment of the video information with first segment information;
    managing at least a portion of the predetermined segment of the video information with a plurality of second segment information;
    managing the first segment information with first package information; and
    configured to collectively managing the plurality of second segment information as a group with second package information, wherein
    the first segment information further manages the second package information.

2. The computer-readable recording medium of claim 1, wherein one of the first segment information, the plurality of second segment information, the first package information, and the second package information comprises:
    retrieval information configured to enable retrieval of frame and/or audio data.

3. The computer-readable recording medium of claim 1, wherein each of the first segment information, the plurality of second segment information, the first package information, and the second package information comprises:
    retrieval information configured to enable retrieval of frame and/or audio data.

4. A video information management method, comprising:
    analyzing a plurality of frames containing video information;
    generating, apart from the video information, video index information; and
    retrieving video information in accordance with the generated video index information, wherein
    the video index information has a tree structure comprising:
        first segment information configured to manage a predetermined segment of the video information;
        a plurality of second segment information, each configured to manage at least a portion of the predetermined segment of the video information;
        first package information configured to manage the first segment information; and
        second package information configured to collectively manage the plurality of second segment information as a group, wherein
        the first segment information is further configured to manage the second package information.

5. The method of claim 4, wherein one of the first segment information, the plurality of second segment information, the first package information, and the second package information comprises:
    visible and/or audible selection information.

6. The method of claim 4, wherein one of the first segment information, the plurality of second segment information, the first package information, and the second package information comprises:
    frame information having
        a node ID corresponding to a location in said tree structure, a range of successive frames managed according to the frame information, and
a pointer indicating a position in the video information.

7. The method of claim 4, wherein one of the first segment information, the plurality of second segment information, the first package information, and the second package information comprises:
sound information having
a node ID corresponding to a location in said tree structure,
a range of successive frames managed according to the frame information, and
a pointer indicating a position in the sound information.

8. The method of claim 4, wherein one of the first segment information and the plurality of second segment information comprises:
a node ID in said tree structure,
identifying information for identifying frame-information, sound information and package information to be managed, and
a pointer to upper package information.

9. The method of claim 4, wherein one of the first package information and the second package information comprises:
a node ID in said tree structure,
identifying information for identifying frame-information, sound information and package information to be managed, and
a pointer to upper package information.

10. The method of claim 4, wherein the video index information comprises:
an attribute object (106) allocated in said tree structure, wherein
the first segment information, the plurality of second segment information, the first package information, and the second package information each comprise:
a pointer to the attribute object (106), and
additional information can be added to one of the first segment information, the plurality of second segment information, the first package information, and the second package information using the attribute object (106) and the pointer to the attribute object (106).

11. The method of claim 4, further comprising:
storing the video index information separately from the video information.

12. A video information management method, comprising:
analyzing a plurality of frames containing video information;
generating, apart from the video information, video index information; and
retrieving video information in accordance with the generated video index information, wherein the video index information comprises:
a tree structure including:
first segment information configured to manage a predetermined segment of the video information;
a plurality of second segment information, each configured to manage at least a portion of the predetermined segment of the video information;
first package information configured to manage the first segment information; and
second package information configured to collectively manage the plurality of second segment information as a group, wherein
the first segment information is further configured to manage the second package information, and the first and plurality of second segment information is configured to manage a range of successive frames;
a first link list configured to indicate an order for the first and plurality of second segment information;
a plurality of second link lists configured to indicate an order of frame and/or audio data; and
a plurality of view information configured to enable retrieval of the frame and/or audio data.

13. The method of claim 12, further comprising:
specifying particular view information from the plurality of view information; and
making a portion of video information corresponding to the particular view visible and/or audible by using a link list corresponding to the particular view information.

14. The method of claim 12, further comprising:
storing the video index information separately from the video information.

15. A computer-readable recording medium storing a computer program with audio index information generated based on audio information recorded therein, the audio index information having a tree structure, the computer program including instructions configured to cause a computer to execute a method comprising:
managing a predetermined segment of the audio information with first segment information;
managing at least a portion of the predetermined segment of the audio information with a plurality of second segment information;
managing the first segment information with first package information; and
collectively managing the plurality of second segment information as a group with second package information, wherein
the first segment information further manages the second package information.

16. The computer-readable recording medium of claim 15, wherein one of the first segment information, the plurality of second segment information, the first package information, and the second package information comprises:
retrieval information configured to enable retrieval of sound data.

17. The computer-readable recording medium of claim 15, wherein each of the first segment information, the plurality of second segment information, the first package information, and the second package information comprises:
retrieval information configured to enable retrieval of sound data.

18. An audio information management method, comprising:
analyzing a plurality of frames containing audio information;
generating, apart from the audio information, audio index information; and
retrieving video information in accordance with the generated audio index information, wherein
the audio index information has a tree structure comprising:
first segment information configured to manage a predetermined segment of the audio information;
a plurality of second segment information, each configured to manage at least a portion of the predetermined segment of the audio information;
first package information configured to manage the first segment information; and second package information configured to collectively manage the plurality of second segment information as a group, wherein
the first segment information is further configured to manage the second package information.

19. The method of claim 18, further comprising:
storing the audio index information separately from the audio information.

20. A video information retrieval apparatus, comprising:
a video retrieval tool;
a video information library connected to the video retrieval tool; and
a video index information database connected to the video retrieval tool and including a computer-readable recording medium with video index information having a tree structure comprising:
first segment information configured to manage a predetermined segment of the video information;
a plurality of second segment information, each configured to manage at least a portion of the predetermined segment of the video information;
first package information configured to manage the first segment information; and
second package information configured to collectively manage the plurality of second segment information as a group, wherein
the first segment information is further configured to manage the second package information.

21. A computer-readable recording medium storing a computer program with video index information generated based on video information recorded therein, the video index information having a tree structure, the computer program including instructions configured to cause a computer to execute a method comprising:
managing a first segment of the video information with a first segment information;
managing a plurality of second segments generated as a result of dividing the first segment according to a first algorithm with a plurality of second segment information;
managing the plurality of second segment information with a first package information;
managing a plurality of third segments generated as a result of dividing the first segment according to a second algorithm with a plurality of third segment information; and
managing the plurality of third segment information with a second package information, wherein
the first segment information further manages the first and the second package information collectively as a group.

22. The computer-readable recording medium of claim 21, wherein one of the first segment information, the plurality of second segment information, the first package information, the plurality of third segment information, and the second package information comprises:
retrieval information configured to enable retrieval of frame and/or audio data.

23. The computer-readable recording medium of claim 21, wherein each of the first segment information, the plurality of second segment information, the first package information, the plurality of third segment information, and the second package information comprises:
retrieval information configured to enable retrieval of frame and/or audio data.

24. A video information management method, comprising:
analyzing a plurality of frames containing video information;
generating, apart from the video information, video index information; and
retrieving video information in accordance with the generated video index information, wherein
the video index information has a tree structure comprising:
a first segment information configured to manage a first segment of the video information;
a plurality of second segment information configured to manage a plurality of second segments generated as a result of dividing the first segment according to a first algorithm;
a first package information configured to manage the plurality of second segment information;
a plurality of third segment information configured to manage a plurality of third segments generated as a result of dividing the first segment according to a second algorithm; and
a second package information configured to manage the plurality of third segment information, wherein
the first segment information is further configured to manage the first and the second package information collectively as a group.

25. The method of claim 24, wherein one of the first segment information, the plurality of second segment information, the plurality of third segment information, the first package information, and the second package information comprises:
visible and/or audible selection information.

26. The method of claim 24, wherein one of the first segment information, the plurality of second segment information, the plurality of third segment information, the first package information, and the second package information comprises:
frame information having
a node ID corresponding to a location in said tree structure,
a range of successive frames managed according to the frame information, and
a pointer indicating a position in the video information.

27. The method of claim 24, wherein one of the first segment information, the plurality of second segment information, the plurality of third segment information, the first package information, and the second package information comprises:
sound information having
a node ID corresponding to a location in said tree structure,
a range of successive frames managed according to the frame information, and
a pointer indicating a position in the sound information.

28. The method of claim 24, wherein one of the first segment information and the plurality of second segment information comprises:
a node ID in said tree structure,
identifying information for identifying frame-information, sound information and package information to be managed, and
a pointer to upper package information.

29. The method of claim 24, wherein one of the first package information and the second package information comprises:
- a node ID in said tree structure,
- identifying information for identifying frame-information, sound information and package information to be managed, and
- a pointer to upper package information.

30. The method of claim 24, wherein the video index information comprises:
- an attribute object (106) allocated in said tree structure, wherein
- the first segment information, the plurality of second segment information, the first package information, and the second package information each comprise:
  - a pointer to the attribute object (106), and
  - additional information can be added to one of the first segment information, the plurality of second segment information, the plurality of third segment information, the first package information, and the second package information using the attribute object (106) and the pointer to the attribute object (106).

31. The method of claim 24, further comprising:
storing the video index information separately from the video information.

32. A computer-readable recording medium storing a computer program with audio index information generated based on audio information recorded therein, the audio index information having a tree structure, the computer program including instructions configured to cause a computer to execute a method comprising:
- managing a first segment of the audio information with a first segment information;
- managing a plurality of second segments generated as a result of dividing the first segment according to a first algorithm with a plurality of second segment information;
- managing the plurality of second segment information with a first package information;
- managing a plurality of third segments generated as a result of dividing the first segment according to a second algorithm with a plurality of third segment information; and
- managing the plurality of third segment information with a second package information, wherein
- the first segment information further manages the first and the second package information collectively as a group.

33. The computer-readable recording medium of claim 32, wherein one of the first segment information, the plurality of second segment information, the plurality of third segment information, the first package information, and the second package information comprises:
retrieval information configured to enable retrieval of sound data.

34. The computer-readable recording medium of claim 32, wherein each of the first segment information, the plurality of second segment information, the plurality of third segment information, the first package information, and the second package information comprises:
retrieval information configured to enable retrieval of sound data.

35. An audio information management method, comprising:
- analyzing a plurality of frames containing audio information;
- generating, apart from the audio information, audio index information; and
- retrieving video information in accordance with the generated audio index information, wherein
- the audio index information has a tree structure comprising:
  - a first segment information configured to manage a first segment of the audio information;
  - a plurality of second segment information configured to manage a plurality of second segments generated as a result of dividing the first segment according to a first algorithm;
  - a first package information configured to manage the plurality of second segment information;
  - a plurality of third segment information configured to manage a plurality of third segments generated as a result of dividing the first segment according to a second algorithm; and
  - a second package information configured to manage the plurality of third segment information, wherein
  - the first segment information is further configured to manage the first and the second package information collectively as a group.

36. The method of claim 35, further comprising:
storing the audio index information separately from the audio information.

37. A video information retrieval apparatus, comprising:
- a video retrieval tool;
- a video information library connected to the video retrieval tool; and
- a video index information database connected to the video retrieval tool and including a computer-readable recording medium with video index information having a tree structure comprising:
  - a first segment information configured to manage a first segment of the video information;
  - a plurality of second segment information configured to manage a plurality of second segments generated as a result of dividing the first segment according to a first algorithm;
  - a first package information configured to manage the plurality of second segment information;
  - a plurality of third segment information configured to manage a plurality of third segments generated as a result of dividing the first segment according to a second algorithm; and
  - a second package information configured to manage the plurality of third segment information, wherein
  - the first segment information is further configured to manage the first and the second package information collectively as a group.

* * * * *